(12) United States Patent
Fraysse et al.

(10) Patent No.: US 12,233,671 B2
(45) Date of Patent: Feb. 25, 2025

(54) TIRE COMPRISING AN IMPROVED BEAD

(71) Applicant: COMPAGNIE GENERALE DES ETABLISSEMENTS MICHELIN, Clermont-Ferrand (FR)

(72) Inventors: Patrice Fraysse, Clermont-Ferrand (FR); Francois Chambriard, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 223 days.

(21) Appl. No.: 17/786,370

(22) PCT Filed: Oct. 9, 2020

(86) PCT No.: PCT/FR2020/051790
§ 371 (c)(1),
(2) Date: Jun. 16, 2022

(87) PCT Pub. No.: WO2021/123522
PCT Pub. Date: Jun. 24, 2021

(65) Prior Publication Data
US 2023/0020083 A1    Jan. 19, 2023

(30) Foreign Application Priority Data
Dec. 19, 2019    (FR) .................. 1914981

(51) Int. Cl.
*B60C 15/04*    (2006.01)
*B60C 9/00*    (2006.01)
*B60C 9/04*    (2006.01)

(52) U.S. Cl.
CPC ............ *B60C 15/04* (2013.01); *B60C 9/0007* (2013.01); *B60C 9/04* (2013.01)

(58) Field of Classification Search
CPC ...... B60C 15/04; B60C 15/00; B60C 15/0009; B29D 2030/485; B29D 2030/48; B29D 2030/1628; B21F 37/00
See application file for complete search history.

(56) References Cited

U.S. PATENT DOCUMENTS 2,966,933 A * 1/1961 Roger .................. B60C 15/04
152/542
2,997,091 A * 8/1961 Debesson ............ B60C 15/04
152/542
(Continued)

FOREIGN PATENT DOCUMENTS
EP    0976535 B1    9/2002
EP    1094930 B1    10/2003
(Continued)

OTHER PUBLICATIONS

International Search Report dated Nov. 10, 2020, in corresponding PCT/FR2020/051790 (6 pages).

*Primary Examiner* — Cedrick S Williams
*Assistant Examiner* — Thomas Frank Schneider
(74) *Attorney, Agent, or Firm* — VENABLE LLP

(57) ABSTRACT

The tire comprises a crown, two sidewalls and two beads, each sidewall connecting each bead to the crown, a carcass reinforcement that is anchored in each bead and extends in each sidewall and radially on the inside of the crown, each bead comprising at least one continuous filamentary reinforcing element (40) comprising N≥2 circumferential turns which are radially superposed on one another. The continuous filamentary reinforcing element (40) comprises a radially outer free end (E1) and a radially inner free end (E2). At least one of the radially outer free end (E1) and the radially inner free end (E2) is threaded between two portions (Continued)

(50, 52) arranged radially on the outside and on the inside of the free end (E1, E2) in question.

15 Claims, 9 Drawing Sheets

(56) References Cited

U.S. PATENT DOCUMENTS

| | | |
|---|---|---|
| 5,660,656 A | 8/1997 | Herbelleauu et al. |
| 6,523,591 B1 | 2/2003 | Billieres et al. |
| 6,923,879 B1 | 8/2005 | Blickwedel et al. |
| 6,972,063 B2 | 12/2005 | Caretta et al. |
| 7,238,248 B2 | 7/2007 | Armellin |
| 7,275,576 B2 | 10/2007 | Armellin |
| 7,314,073 B2 | 1/2008 | Pialot |
| 7,416,007 B2 | 8/2008 | Caretta et al. |
| 2001/0042587 A1 | 11/2001 | Caretta et al. |
| 2005/0028919 A1 | 2/2005 | Panning |
| 2005/0061415 A1 | 3/2005 | Armellin |
| 2005/0061417 A1 | 3/2005 | Armellin |
| 2005/0077011 A1 | 4/2005 | Pialot |
| 2005/0081977 A1 | 4/2005 | Caretta et al. |
| 2016/0167438 A1 | 6/2016 | Petitjean et al. |
| 2018/0117970 A1* | 5/2018 | Le Clerc ............... B60C 9/2003 |

FOREIGN PATENT DOCUMENTS

| | | |
|---|---|---|
| EP | 1463627 A0 | 10/2004 |
| FR | 2771050 A1 | 5/1999 |
| JP | 2004-203170 A | 7/2004 |
| WO | 00/38906 A1 | 7/2000 |
| WO | 02/096631 A1 | 12/2002 |
| WO | 03/035378 A1 | 5/2003 |
| WO | 03/101713 A1 | 12/2003 |

* cited by examiner

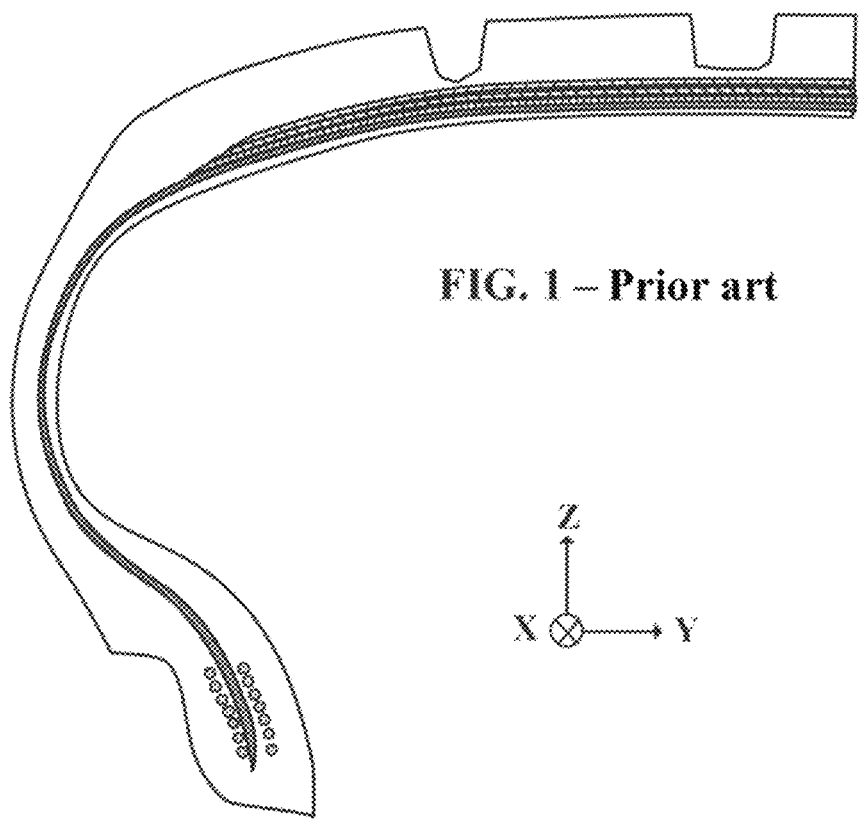
FIG. 1 – Prior art
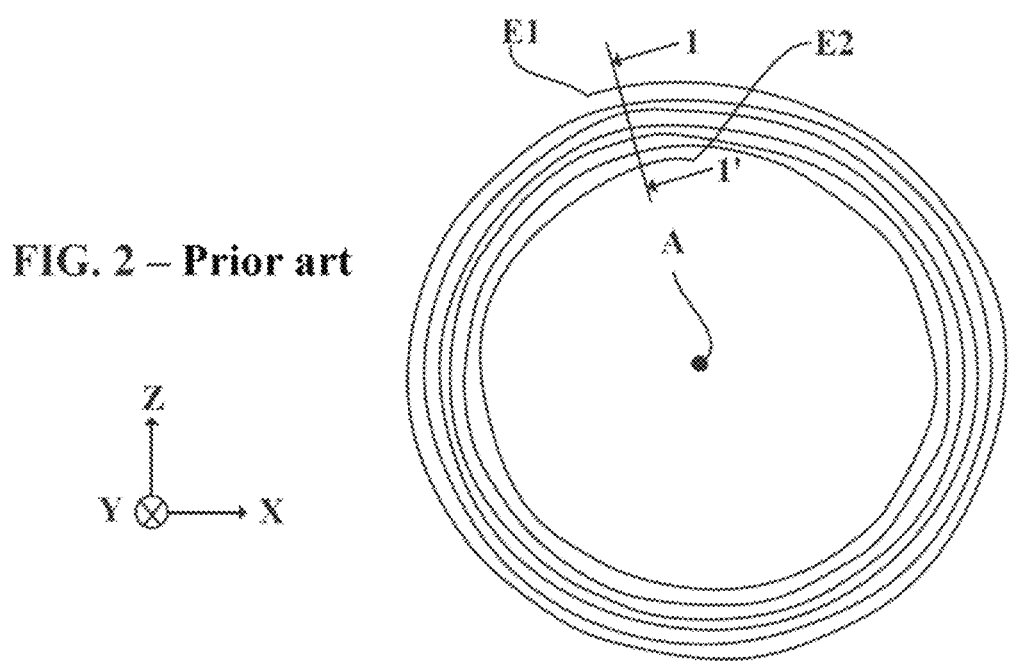
FIG. 2 – Prior art

TIRE COMPRISING AN IMPROVED BEAD

BACKGROUND

The present invention relates to a tyre and to a method for manufacturing such a tyre.

A tyre, which is shown in a view on a meridian section plane in FIG. 1, of substantially toric shape about an axis of revolution substantially coincident with the axis of rotation of the tyre is known from the prior art. The tyre comprises a crown, two sidewalls and beads, each sidewall connecting each bead to the crown. The tyre also comprises a carcass reinforcement that is anchored in each bead and extends in each sidewall and radially on the inside of the crown.

Each bead comprises an axially inner continuous filamentary reinforcing element arranged axially on the inside of the carcass reinforcement and an axially outer continuous filamentary reinforcing element arranged axially on the outside of the carcass reinforcement.

As illustrated in FIG. 2, each axially inner and outer continuous filamentary reinforcing element comprises a plurality of circumferential turns, about the axis of revolution, which are superposed on one another. Each continuous filamentary reinforcing element comprises a radially outer free end E1 and a radially inner free end E2.

In order to improve grip on dry ground, in particular when used on a circuit, some users of this tyre usually lower the inflation pressure of the tyre, sometimes even to below the minimum threshold recommended by the tyre manufacturer. In these use cases that result in extreme stresses on the tyre, each bead is subjected to extremely high loads, these loads being liable to bring about risks of cracking at the interfaces between each radially outer free end E1 and radially inner free end E2 and each elastomer matrix in which each radially outer free end E1 and radially inner free end E2 is embedded.

The aim of the invention is to eliminate any risk of cracking at one and/or the other of the radially inner and radially outer free ends of each continuous filamentary reinforcing element.

SUMMARY

To this end, a subject of the invention is a tyre of substantially toric shape about an axis of revolution, comprising a crown, two sidewalls and two beads, each sidewall connecting each bead to the crown, the tyre comprising at least one continuous filamentary reinforcing element comprising N≥2 circumferential turns about the axis of revolution which are radially superposed on one another, the continuous filamentary reinforcing element comprising a radially outer free end and a radially inner free end, the continuous filamentary reinforcing element extending radially at least in part in one of the two beads, wherein, in said tyre, at least one of conditions I and II is satisfied:

I—the radially outer free end is, at the azimuth of the radially outer free end, arranged radially between:
- at least one first portion of the continuous filamentary reinforcing element, this first portion being arranged radially on the outside of the radially outer free end, and
- at least one second portion of the continuous filamentary reinforcing element, this second portion being arranged radially on the inside of the radially outer free end, II—the radially inner free end is, at the azimuth of the radially inner free end, arranged radially between:
- at least one first portion of the continuous filamentary reinforcing element, this first portion being arranged radially on the outside of the radially inner free end, and
- at least one second portion of the continuous filamentary reinforcing element, this second portion being arranged radially on the inside of the radially inner free end.

The inventors behind the invention discovered that, in the above-described prior art tyre, the loads were concentrated, depending on the architecture of the tyre, in a region comprising the two radially innermost turns and/or in a region comprising the two radially outermost turns. Thus, the inventors behind the invention found that, by moving one and/or the other of the free ends out of the regions in which the stress concentrations are highest, it was possible to eliminate any risk of cracking. Such a solution is very advantageous, in particular compared with the solutions conventionally used to reduce the risks of cracking, for example the use of elastomer matrices having high resistance to cracking. This is because, while such elastomer matrices may make it possible to solve the problem, they have a negative effect on the roadholding of the tyre, in particular the cornering stiffness, on account of their low modulus.

Thus, condition I characterizes the fact that the radially outer free end is threaded between two portions of the continuous filamentary reinforcing element. Analogously, condition II characterizes that fact that the radially inner free end is threaded between two portions of the continuous filamentary reinforcing element. An implicit consequence of the invention is that one portion of the continuous filamentary reinforcing element crosses at least one other portion of the continuous filamentary reinforcing element, the number of crossings depending on where the first and second portions are situated.

Another advantage of the invention is, given the improved resistance to cracking, that it makes it possible to improve grip on dry ground. Thus, the recommendation could be given to run at a lower pressure than the pressure recommended for the prior art tyre and, consequently, to improve grip on dry ground. Use could also be made of a tyre tread with a composition that makes it possible to improve grip on dry ground, this improvement in grip significantly increasing the risk of cracking for a prior art tyre while being without consequence for the tyre according to the invention.

The choice to implement condition I alone, condition II alone, or conditions I and II together will be determined by a person skilled in the art depending on the sensitivity of the tyre to cracking. Specifically, certain tyres may be more sensitive to cracking in the region of the radially outer free end while others may be more sensitive to cracking in the regions of the radially inner free end. Lastly, yet other tyres may be equally sensitive to cracking in the regions of both the radially inner and outer free ends.

According to one feature of the invention, the continuous filamentary reinforcing element extends radially at least in part in the bead. Thus, the continuous filamentary reinforcing element extends radially between two radially inner and radially outer radial ends, at least the radially inner radial end of the continuous filamentary reinforcing element being contained between the radially inner and outer radial sides that radially delimit the bead.

The expression "free ends" means that the two radially inner and outer ends are not joined together by a joining means, for example by a sleeve.

The term "continuous" means that each constituent material of the filamentary reinforcing element is integral along the filamentary reinforcing element. Thus, for example, while the filamentary reinforcement element comprises an assembly of several metal monofilaments, each metal monofilament is integral and therefore uninterrupted between the two free ends of the filamentary reinforcing element.

The term "filamentary" means an element extending longitudinally along a main axis and having a second perpendicular to the main axis, the largest dimension G of which is relatively small compared with the dimension L along the main axis. The expression "relatively small" means that L/G is greater than or equal to 100, preferably greater than or equal to 1000. This definition covers both filamentary elements with a circular section and filamentary elements with a non-circular section, for example a polygonal or oblong section. Very preferably, each filamentary element has a circular section.

The expression "axial direction" means the direction substantially parallel to the axis of revolution of the tyre, that is to say the axis of rotation of the tyre.

The expression "circumferential direction" means the direction that is substantially perpendicular both to the axial direction and to a radius of the tyre (in other words, tangent to a circle centred on the axis of rotation of the tyre).

The expression "radial direction" means the direction along a radius of the tyre, that is to say any direction that intersects the axis of rotation of the tyre and is substantially perpendicular to that axis.

The expression "median plane of the tyre" (denoted M) means the plane perpendicular to the axis of rotation of the tyre which is situated axially mid-way between the two beads and passes through the axial middle of the crown reinforcement.

The expression "equatorial circumferential plane of the tyre" (denoted E) means the theoretical cylindrical surface passing through the equator of the tyre, perpendicular to the median plane and to the radial direction. The equator of the tyre is, in a meridian section plane (plane perpendicular to the circumferential direction and parallel to the radial and axial directions), the axis that is parallel to the axis of rotation of the tyre and situated equidistantly between the radially outermost point of the tread that is intended to be in contact with the ground and the radially innermost point of the tyre that is intended to be in contact with a support, for example a rim, the distance between these two points being equal to H.

The expression "meridian plane" means a plane parallel to and containing the axis of rotation of the tyre and perpendicular to the circumferential direction.

The term "bead" means the portion of the tyre intended to allow the tyre to be attached to a mounting support, for example a wheel comprising a rim. Thus, each bead is notably intended to be in contact with a flange of the rim allowing it to be attached.

Any range of values denoted by the expression "between a and b" represents the range of values extending from more than a to less than b (that is to say excluding the end-points a and b), whereas any range of values denoted by the expression "from a to b" means the range of values extending from a up to b (that is to say including the strict end-points a and b).

The tyres of the invention are preferably intended for passenger vehicles as defined according to the European Tyre and Rim Technical Organisation, or "ETRTO", standard of 2019. Advantageously, such a tyre has a section in a meridian section plane that is characterized by a section height H and a nominal section width S within the meaning of the European Tyre and Rim Technical Organisation, or "ETRTO", standard of 2019, such that the nominal aspect ratio H/S, expressed as a percentage, is at most equal to 70 and is at least equal to 25, and the nominal section width S is at least equal to 205 mm and at most equal to 385 mm. Moreover, the diameter at the flange D, defining the nominal diameter of the mounting rim of the tyre, is at least equal to 12 inches, preferably at least equal to 16 inches and at most equal to 24 inches.

In the following text, where reference is made to the first portion and to the second portion of the condition I, I', I" or EI, reference is implicitly made to the first portion and to the second portion in relation to the radially outer free end. Analogously, where reference is made to the first portion and to the second portion of the condition II, II', II" or EII, reference is implicitly made to the first portion and to the second portion in relation to the radially inner free end.

In particularly advantageous embodiments, the or each continuous filamentary reinforcing element comprises an assembly of several metal elementary monofilaments.

The expression "metal elementary monofilament" means an integral filament made entirely of one or more metals or metal alloys. Such metal elementary monofilaments are produced for example by a casting method followed by a drawing method, and optionally followed by a metal coating method. Such metal elementary monofilaments are preferably made of steel, more preferably made of pearlitic (or ferritic-pearlitic) carbon steel, referred to as "carbon steel" below, or made of stainless steel (by definition steel comprising at least 11% chromium and at least 50% iron). However, it is of course possible to use other steels or other alloys. When a carbon steel is advantageously used, its carbon content (% by weight of steel) is preferably from 0.05% to 1.2%, in particular from 0.5% to 1.1%; these contents represent a good compromise between the mechanical properties required for the tyre and the feasibility of the metal elementary monofilaments. The metal used, whether it is in particular a carbon steel or a stainless steel, may itself be coated with a layer of metal, which improves for example the workability of the metal elementary monofilaments or the wear properties of the metal elementary monofilaments, such as properties of grip, corrosion resistance or resistance to ageing. According to a preferred embodiment, each metal elementary monofilament is covered with a layer of brass (Zn—Cu alloy), of zinc or of bronze. Each metal elementary monofilament is, as described above, preferably made of carbon steel, and has a mechanical strength ranging from 1000 MPa to 5000 MPa. Such mechanical strengths correspond to the steel grades commonly encountered in the field of tyres, namely the NT (Normal Tensile), HT (High Tensile), ST (Super Tensile), SHT (Super High Tensile), UT (Ultra Tensile), UHT (Ultra High Tensile) and MT (Mega Tensile) grades, the use of high mechanical strengths potentially allowing improved reinforcement of the matrix in which the metal elementary monofilaments are intended to be embedded and lightening of the matrix reinforced in this way. The one or the assembly of several metal elementary monofilaments may be coated with a polymer composition, for example as described in US20160167438.

In other embodiments, it may nevertheless be conceivable for the or each continuous filamentary reinforcing element to comprise at least one textile elementary monofilament, preferably at least one strand of several textile elementary monofilaments and even more preferably an assembly of several strands of several textile elementary monofilaments.

In one advantageous embodiment, only condition I is satisfied. The inventors behind the invention have determined that, in the majority of tyre architectures, the radially outer free end was the free end most likely to result in risks of cracking and that it was sufficient to thread only this radially outer free end in order to eliminate any risk.

In another embodiment that is usable in particular in the case of ultra-sport tyres in which the stress levels are extremely high, conditions I and II are satisfied.

In order to minimize the bulk of the continuous filamentary reinforcing element, with the continuous filamentary reinforcing element comprising N≥1 complete circumferential turns and at most one incomplete circumferential turn, N is less than or equal to 10, preferably less than or equal to 8. The expression "complete circumferential turn" means a portion of the continuous filamentary reinforcing element that describes, from a reference azimuth, an angle equal to 360° about the axis of revolution of the tyre or of the manufacturing support. By contrast, an incomplete circumferential turn describes, starting from a reference azimuth, only an angle of less than 360° about the axis of revolution of the tyre or of the support. The or each continuous filamentary reinforcing element may be made up of N complete circumferential turns Tk without an incomplete circumferential turn T'k+1 or be made up of N complete circumferential turns Tk and of one incomplete circumferential turn T'k+1, k ranging from 1 to N on progressing from the radially outer end to the radially inner end in the case of condition I and k ranging from 1 to N on progressing from the radially inner end to the radially outer end in the case of condition II.

Preferably, in order to avoid a situation in which the radially outer free end or the radially inner free end is positioned on the path of another portion of the continuous filamentary reinforcing element, this possibly causing an instability during the manufacture of the tyre and therefore a region of the continuous filamentary reinforcing element that is liable to be sensitive to cracking:
  the first portion of the continuous filamentary reinforcing element arranged radially on the outside of the radially outer free end and the second portion of the continuous filamentary reinforcing element arranged radially on the inside of the radially outer free end are radially consecutive,
  the first portion of the continuous filamentary reinforcing element arranged radially on the outside of the radially inner free end and the second portion of the continuous filamentary reinforcing element arranged radially on the inside of the radially inner free end are radially consecutive.

The expression "radially consecutive" means that the first and second portions are arranged such that, at the azimuth of the free end in question, apart from the free end in question, there are no other portions of the continuous filamentary reinforcing element radially interposed between each portion radially on the outside and the inside of the free end in question.

Advantageously:
  the first portion of the continuous filamentary reinforcing element arranged radially on the outside of the radially outer free end is, at the azimuth of the radially outer free end, the radially outermost portion of the continuous filamentary reinforcing element,
  the second portion of the continuous filamentary reinforcing element arranged radially on the inside of the radially inner free end is, at the azimuth of the radially inner free end, the radially innermost portion of the continuous filamentary reinforcing element.

This minimizes the number of crossings between the portions of the continuous filamentary reinforcing element and, consequently, the local overthicknesses in each bead of the tyre. Thus, in this case, there is only one crossing between two portions of the continuous filamentary reinforcing element.

In order to limit the radial height of the continuous filamentary reinforcing element and not to expose the latter to bending stresses that are liable to increase the risks of cracking, in particular at the radially outer free end, the continuous filamentary reinforcing element extends radially entirely in the bead. In other words, the bead comprises the continuous filamentary reinforcing element in its entirety. Thus, each radially inner and radially outer radial end of the continuous filamentary reinforcing element is contained between the radially inner and outer radial sides that radially delimit the bead.

Advantageously, the tyre comprises a carcass reinforcement that is anchored in each bead and extends in each sidewall and radially on the inside of the crown.

The continuous filamentary reinforcing element allows the carcass reinforcement to be anchored in the bead.

In one particularly advantageous embodiment, the continuous filamentary reinforcing element is arranged axially on the outside of the carcass reinforcement. Specifically, the inventors identified that, with the continuous filamentary reinforcing element arranged axially on the outside of the carcass reinforcement being the one that is most stressed and loaded by the rim, it was advantageous to thread primarily one and/or the other of the free ends of this axially outer continuous filamentary reinforcing element in order to effectively eliminate the risks of cracking.

The expression "arranged axially on the outside of the carcass reinforcement" means that, in a meridian section plane of the tyre, with the continuous filamentary reinforcing element extending radially between two radially inner and radially outer radial ends, the portion of the carcass reinforcement extending radially between two axial straight lines passing through the radially inner and radially outer ends is arranged axially on the inside of the continuous filamentary reinforcing element. Analogously, the expression "arranged axially on the inside of the carcass reinforcement" means that, in a meridian section plane of the tyre, the portion of the carcass reinforcement extending radially between two axial straight lines passing through the radially inner and radially outer axial ends is arranged axially on the outside of the continuous filamentary reinforcing element.

In embodiments that make it possible to effectively anchor the carcass reinforcement, each bead comprises:
  an axially inner continuous filamentary reinforcing element arranged axially on the inside of the carcass reinforcement,
  an axially outer continuous filamentary reinforcing element arranged axially on the outside of the carcass reinforcement.

In these embodiments that make it possible to effectively anchor the carcass reinforcement and avoid any cracking in the vicinity of the radially outer and/or radially inner free ends of the axially inner continuous filamentary reinforcing element, the axially inner continuous filamentary reinforcing element comprises N≥2 circumferential turns about the axis of revolution which are radially superposed on one another, with the axially inner filamentary reinforcing element comprising a radially outer free end and a radially inner free end, at least one of the following conditions I', II' is satisfied:

I'—the radially outer free end of the axially inner continuous filamentary reinforcing element is, at the azimuth of the radially outer free end, arranged radially between:
- at least one first portion of the axially inner continuous filamentary reinforcing element, this first portion being arranged radially on the outside of the radially outer free end, and
- at least one second portion of the axially inner continuous filamentary reinforcing element, this second portion being arranged radially on the inside of the radially outer free end, II'—the radially inner free end of the axially inner continuous filamentary reinforcing element is, at the azimuth of the radially inner free end, arranged radially between:
- at least one first portion of the axially inner continuous filamentary reinforcing element, this first portion being arranged radially on the outside of the radially inner free end, and
- at least one second portion of the axially inner continuous filamentary reinforcing element, this second portion being arranged radially on the inside of the radially inner free end.

In these embodiments that make it possible to effectively anchor the carcass reinforcement and avoid any cracking in the vicinity of the radially outer and/or radially inner free ends of the axially outer continuous filamentary reinforcing element, the axially outer continuous filamentary reinforcing element comprises $N \geq 2$ circumferential turns about the axis of revolution which are radially superposed on one another, with the axially outer filamentary reinforcing element comprising a radially outer free end and a radially inner free end, at least one of the following conditions I", II" is satisfied:

I"—the radially outer free end of the axially outer continuous filamentary reinforcing element is, at the azimuth of the radially outer free end, arranged radially between:
- at least one first portion of the axially outer continuous filamentary reinforcing element, this first portion being arranged radially on the outside of the radially outer free end, and
- at least one second portion of the axially outer continuous filamentary reinforcing element, this second portion being arranged radially on the inside of the radially outer free end, II"—the radially inner free end of the axially outer continuous filamentary reinforcing element is, at the azimuth of the radially inner free end, arranged radially between:
- at least one first portion of the axially outer continuous filamentary reinforcing element, this first portion being arranged radially on the outside of the radially inner free end, and
- at least one second portion of the axially outer continuous filamentary reinforcing element, this second portion being arranged radially on the inside of the radially inner free end.

In embodiments that make it possible to avoid a turn-up of at least one carcass layer about a reinforcing element and therefore to simplify the architecture of the tyre, with the carcass reinforcement comprising at least one carcass layer, the or each carcass layer being delimited axially by two axial edges, each axial edge is arranged axially between the radially inner end of the axially inner continuous filamentary reinforcing element and the radially inner end of the axially outer continuous filamentary reinforcing element.

The expression "axially between" means that each axial edge of the or each carcass layer is, in a meridian section plane of the tyre, contained between two radial straight lines passing through each radially inner end of the continuous filamentary reinforcing elements in question.

In a first variant, the carcass reinforcement comprises a single carcass layer. In this first variant, apart from the single carcass layer, the carcass reinforcement does not have any layer reinforced by filamentary reinforcing elements. The filamentary reinforcing elements of such reinforced layers excluded from the carcass reinforcement of the tyre comprise the metal filamentary reinforcing elements and the textile filamentary reinforcing elements. Very preferably, the carcass reinforcement is made up of the single carcass layer.

In a second variant, which is usable in particular for tyres that require additional reinforcing of the carcass reinforcement, for example to allow them to meet the requirements that allow an "Extra-Load" or "Reinforced" marking, the carcass reinforcement comprises a radially inner carcass layer and a radially outer carcass layer arranged on the outside of the radially inner carcass layer.

In the second variant, in order to improve the anchoring of the two carcass layers, with each bead comprising an axially intermediate continuous filamentary reinforcing element arranged axially between the axially inner continuous filamentary reinforcing element and the axially outer continuous filamentary reinforcing element:
- with the radially inner carcass layer being delimited axially by two axial edges, one of the axial edges of the radially inner carcass layer is arranged axially between the radially inner end of the axially inner continuous filamentary reinforcing element and the radially inner end of the axially intermediate continuous filamentary reinforcing element, and
- with the radially outer carcass layer being delimited axially by two axial edges, one of the axial edges of the radially outer carcass layer is arranged axially between the radially inner end of the axially intermediate continuous filamentary reinforcing element and the radially inner end of the axially outer continuous filamentary reinforcing element.

Advantageously, the axially intermediate continuous filamentary reinforcing element may comprise $Nm \geq 2$ circumferential turns about the axis of revolution which are radially superposed on one another, with the axially intermediate continuous filamentary reinforcing layer comprising a radially outer free end and a radially inner free end and being able to be in accordance with the invention, that is to say satisfy at least one of the following conditions I''' and II''':

I'''—the radially outer free end is, at the azimuth of the radially outer free end, arranged radially between:
- at least one first portion of the axially intermediate continuous filamentary reinforcing element, this first portion being arranged radially on the outside of the radially outer free end, and
- at least one second portion of the axially intermediate continuous filamentary reinforcing element, this second portion being arranged radially on the inside of the radially outer free end, II'''—the radially inner free end is, at the azimuth of the radially inner free end, arranged radially between:
- at least one first portion of the axially intermediate continuous filamentary reinforcing element, this first portion being arranged radially on the outside of the radially inner free end, and
- at least one second portion of the axially intermediate continuous filamentary reinforcing element, this second portion being arranged radially on the inside of the radially inner free end.

In order to ensure that the tyre comprises the expected number of circumferential turns around the entire circumference of the tyre, the azimuth of the radially outer free end and the azimuth of the radially inner free end are separated from one another by an angular spacing of between 90° and 180°. Moreover, by angularly offsetting the azimuth of the radially outer free end and the azimuth of the radially inner free end, the uniformity of the tyre is improved by distributing the mass of the continuous filamentary reinforcing element.

In embodiments that make it possible to obtain performance aspects of tyres known as radial tyres as defined by the ETRTO, the carcass reinforcement comprises at least one carcass layer, the or each carcass layer comprising carcass filamentary reinforcing elements, each carcass filamentary reinforcing element extending substantially along a main direction that forms an angle, terms of absolute value, greater than or equal to 60°, preferably ranging from 80° to 90°, with the circumferential direction of the tyre.

The expression "main direction in which a filamentary reinforcing element extends" means the direction in which the filamentary reinforcing element extends along its greatest length. The main direction in which a filamentary reinforcing element extends may be rectilinear or curved, the reinforcing element being able to describe a rectilinear or wavy path along its main direction.

In the tyre, the angle in question is the angle, in terms of absolute value, which is the smaller of the two angles defined between the reference straight line, in this case the circumferential direction of the tyre, and the main direction in which the filamentary reinforcing element in question extends.

In the tyre, the orientation of an angle means the direction, clockwise or anticlockwise, in which it is necessary to turn from the reference straight line, in this case the circumferential direction of the support or of the tyre, defining the angle to reach the main direction in which the filamentary reinforcing element in question extends.

Advantageously, the crown comprises:
  a tread intended to come into contact with the ground when the tyre is running,
  a crown reinforcement arranged radially between the tread and the carcass reinforcement.

Thus, the crown comprises the tread and the crown reinforcement. A tread is understood to be a strip of polymer, preferably elastomer, material delimited radially towards the outside by a surface intended to be in contact with the ground and radially towards the inside by the crown reinforcement.

The strip of polymer material is made up of a layer of a polymer, preferably elastomer, material or made up of a stack of several layers, each layer being made up of a polymer, preferably elastomer, material.

Advantageously, the crown reinforcement comprises a working reinforcement comprising at least one working layer, the or each working layer comprising working filamentary reinforcing elements, each working filamentary reinforcing element extending along a main direction that forms an angle, in terms of absolute value, strictly greater than 10°, preferably ranging from 15° to 50° and more preferably from 25° to 45°, with the circumferential direction of the tyre.

In order to achieve effective triangulation of the crown of the tyre, with the working reinforcement comprising two working layers, the main direction in which each working filamentary reinforcing element of one of the working layers extends and the main direction in which each working filamentary reinforcing element of the other of the working layers extends form angles of opposite orientations with the circumferential direction of the tyre.

In order to improve the geometric integrity and the performance aspects of the tyre at high speed or under high stresses, the crown reinforcement comprises a hoop reinforcement comprising at least one hooping layer, the or each hooping layer comprising at least one hooping filamentary reinforcing element wound circumferentially in a helix along a main direction of the or of each hooping filamentary reinforcing element that forms an angle, in terms of absolute value, less than or equal to 10°, preferably less than or equal to 7° and more preferably less than or equal to 5°, with the circumferential direction of the tyre.

The hoop reinforcement is thus radially interposed between the working reinforcement and the tread.

In an advantageous embodiment, the crown reinforcement comprises a single hoop reinforcement and a single working reinforcement. Thus, apart from the hoop reinforcement and the working reinforcement, the crown reinforcement does not have any reinforcement reinforced by filamentary reinforcing elements. The filamentary reinforcing elements of such reinforcements excluded from the crown reinforcement of the tyre comprise the metal filamentary reinforcing elements and the textile filamentary reinforcing elements. Very preferably, the crown reinforcement is made up of the hoop reinforcement and the working reinforcement.

In a very preferred embodiment, apart from the crown reinforcement, the crown does not have any reinforcement reinforced by filamentary reinforcing elements. The filamentary reinforcing elements of such reinforcements excluded from the crown of the tyre comprise the metal filamentary reinforcing elements and the textile filamentary reinforcing elements. Very preferably, the crown is made up of the tread and the crown reinforcement.

In a very preferred embodiment, the carcass reinforcement is arranged so as to be directly radially in contact with the crown reinforcement and the crown reinforcement is arranged so as to be directly radially in contact with the tread.

The expression "directly radially in contact" means that the objects in question that are directly radially in contact with one another, in this case the layers, reinforcements or the tread, are not separated radially by any object, for example by any layer, reinforcement or strip interposed radially between the objects in question that are directly radially in contact with one another.

Advantageously, the filamentary reinforcing elements of each layer are embedded in an elastomer matrix. The different layers may comprise the same elastomer matrix or different elastomer matrices.

An elastomer matrix means a matrix that exhibits elastomeric behaviour in the crosslinked state. Such a matrix is advantageously obtained by crosslinking a composition comprising at least one elastomer and at least one other component. Preferably, the composition comprising at least one elastomer and at least one other component comprises an elastomer, a crosslinking system and a filler. The compositions used for these layers are conventional compositions for calendering reinforcers, typically based on natural rubber or some other diene elastomer, a reinforcing filler such as carbon black, a vulcanization system and conventional additives. The adhesion between the filamentary reinforcing elements and the matrix in which they are embedded is ensured for example by a conventional adhesive composition, for example an adhesive of the RFL type or an equivalent adhesive.

Advantageously, each working filamentary reinforcing element is metallic. A metal filamentary element means, by definition, a filamentary element formed from one or an assembly of several elementary monofilaments made entirely (for 100% of the threads) of a metal material. Such a metal filamentary element is preferably implemented with one or more threads made of steel, more preferably of pearlitic (or ferritic-pearlitic) carbon steel referred to as "carbon steel" below, or made of stainless steel (by definition steel comprising at least 11% chromium and at least 50% iron). However, it is of course possible to use other steels or other alloys. When a carbon steel is advantageously used, its carbon content (% by weight of steel) ranges preferably from 0.05% to 1.2%, in particular from 0.5% to 1.1%; these contents represent a good compromise between the mechanical properties required for the tyre and the feasibility of the threads. The metal or the steel used, whether it is in particular a carbon steel or a stainless steel, may itself be coated with a layer of metal, which improves for example the workability of the metal cord and/or its constituent elements, or the wear properties of the cord and/or of the tyre themselves, such as properties of grip, corrosion resistance or resistance to ageing. According to a preferred embodiment, the steel used is covered with a layer of brass (Zn—Cu alloy) or of zinc. Each metal elementary monofilament is, as described above, preferably made of carbon steel, and has a mechanical strength ranging from 1000 MPa to 5000 MPa. Such mechanical strengths correspond to the steel grades commonly encountered in the field of tyres, namely the NT (Normal Tensile), HT (High Tensile), ST (Super Tensile), SHT (Super High Tensile), UT (Ultra Tensile), UHT (Ultra High Tensile) and MT (Mega Tensile) grades, the use of high mechanical strengths potentially allowing improved reinforcement of the matrix in which the cord is intended to be embedded and lightening of the matrix reinforced in this way. The one or the assembly of several metal elementary monofilaments may be coated with a polymer composition, for example as described in US20160167438.

Another subject of the invention is a method for manufacturing a tyre as defined above, in which:
 a mass of polymer composition is placed on a support substantially exhibiting symmetry of revolution about an axis of revolution of the support, the mass of polymer composition being intended to form at least a part of at least one of the beads, then
 one or the other of the following steps EI and EII is carried out:
EI—the radially outer free end is placed directly in contact with the mass of polymer composition and then the continuous filamentary reinforcing element is wound through N≥2 circumferential turns about the axis of revolution of the support, which are superposed on one another, such that the radially outer free end is, at the azimuth of the radially outer free end, arranged radially between:
 at least the first portion of the continuous filamentary reinforcing element, which is arranged radially on the outside of the radially outer free end, and
 at least the second portion of the continuous filamentary reinforcing element, which is arranged radially on the inside of the radially outer free end,
EII—the radially inner free end is placed directly in contact with the mass of polymer composition and then the continuous filamentary reinforcing element is wound through N≥2 circumferential turns about the axis of revolution of the support, which are superposed on one another, such that the radially inner free end is, at the azimuth of the radially inner free end, arranged radially between:
 at least the first portion of the continuous filamentary reinforcing element, which is arranged radially on the outside of the radially inner free end, and
 at least the second portion of the continuous filamentary reinforcing element, which is arranged radially on the inside of the radially inner free end.

Such a method may be implemented in particular with a non-deformable rigid support of substantially toroidal shape about the axis of revolution of the support, for example as described in WO03/101713, EP1094930, EP1463627 or EP0976535.

The method advantageously makes it possible to trap the free end intended to be threaded by placing it firstly on the mass of polymer composition and covering it with the turns that are formed subsequently. Thus, once the free end that is intended to be threaded is covered with one or more subsequently formed turns, the free end intended to be threaded is trapped and can no longer slip, thereby allowing easy subsequent handling of the green tyre thus formed.

This method is notably much more advantageous than a method in which winding is started at the free end not intended to be threaded and which, although making it possible to manufacture a tyre according to the invention, would have the free end intended to be threaded positioned last and therefore not trapped. The free end intended to be thread would therefore need to cross, axially on the outside, one or more turns formed beforehand and would risk coming unstuck from the mass of polymer composition unless an additional means for fixing this free end is provided on the green tyre thus formed.

A polymer composition according to the invention is a composition comprising at least one polymer. A polymer is a macromolecule resulting from the polymerization of one or more monomers. Among the preferred polymers, mention will be made of thermoplastic polymers, thermosetting polymers and co-crosslinkable polymers. Among the thermoplastic polymers, mention will be made for example of polyesters, aromatic polyamides, aliphatic polyamides, polyurethanes, thermoplastic elastomers, preferably diene thermoplastic elastomers, copolymers of these polymers and mixtures of these polymers. Among the thermosetting polymers, mention will be made of aminoplast resins, phenoplasts, polyurethanes, vinyl ester resins and mixtures of these polymers. Among the co-crosslinkable polymers, mention will be made of the polymers comprising at least one unsaturation or double bond, for example, and very preferably, diene elastomers. The polymer composition may obviously comprise further constituents, for example a crosslinking system, fillers, resins, or other additives commonly used in the field of tyres.

BRIEF DESCRIPTION OF THE FIGURES

The invention and its advantages will be easily understood in the light of the detailed description and the non-limiting exemplary embodiments which follow, and from FIGS. 1 to 27, which relate to these examples and in which:
FIG. 1 is a view of a tyre according to the prior art on the meridian section plane 1-1' in FIG. 2;
FIG. 2 is a schematic view of a separated continuous filamentary reinforcing element of the tyre in FIG. 1.

DETAILED DESCRIPTION

A frame of reference X, Y, Z corresponding to the usual axial (Y), radial (Z) and circumferential (X) directions, respectively, of a tyre is shown in the figures relating to the tyre. A frame of reference x, y, z corresponding to the usual axial (y), radial (z) and circumferential (x) directions, respectively, of a manufacturing support of substantially toric shape about the axis y is shown in the figures relating to the method.

Figure 3:
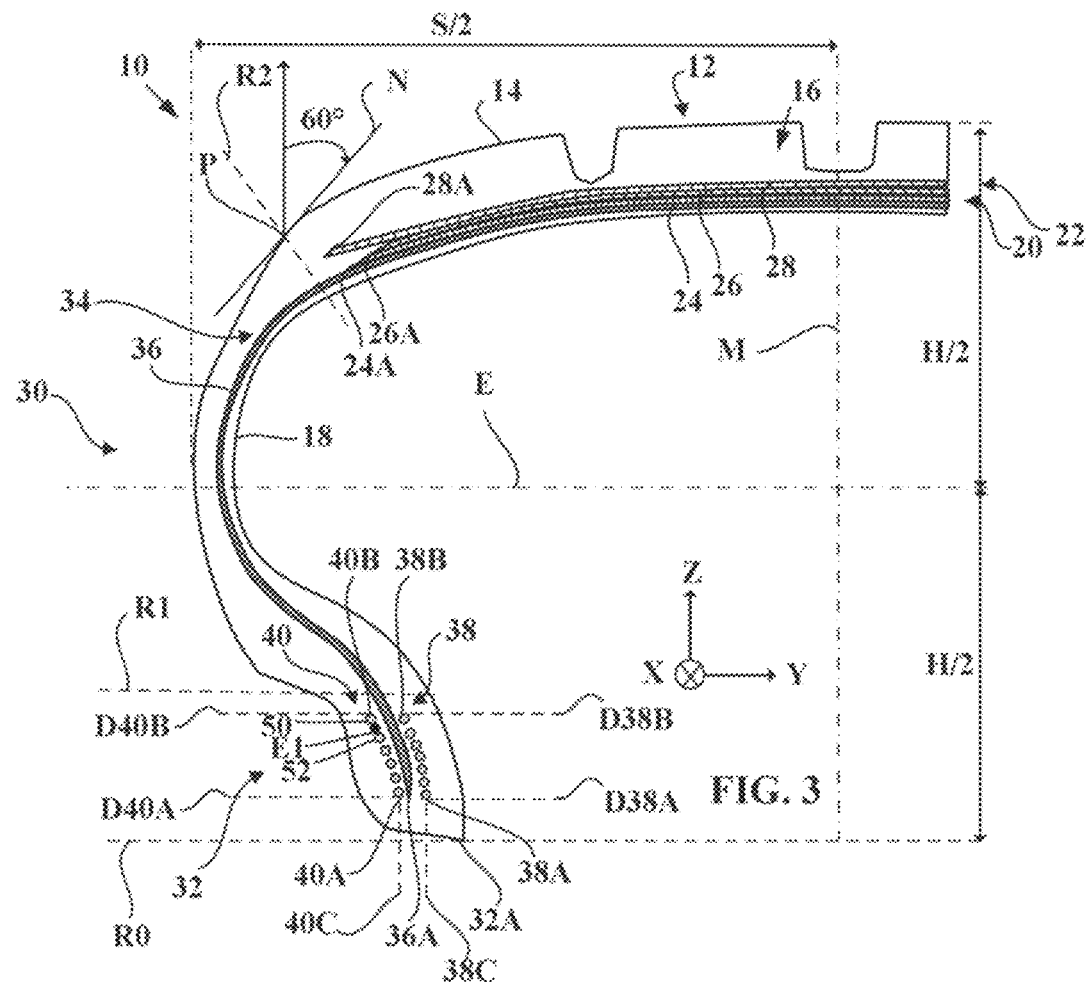
FIG. 3 is a view similar to the one in FIG. 1 of a tyre according to a first embodiment of the invention.

FIG. 3 shows a tyre according to the invention and denoted by the general reference 10. The tyre 10 has a substantially toric shape about an axis of revolution substantially parallel to the axial direction Y. The tyre 10 is in this case intended for a passenger vehicle and has the size 275/35R20.

The tyre 10 comprises a crown 12 comprising a tread 14 intended to come into contact with the ground when it is running and a crown reinforcement 16 extending in the crown 12 in the circumferential direction X. The tyre 10 also comprises an airtight layer 18 with respect to an inflation gas that is intended to delimit an internal cavity closed with a mounting support for the tyre 10 once the tyre 10 has been mounted on the mounting support, for example a rim. The airtight layer 18 is based on butyl.

The crown reinforcement 16 comprises a working reinforcement 20 and a hoop reinforcement 22.

The working reinforcement 16 comprises at least one working layer and in this case comprises two working layers 24, 26. In this particular instance, the working reinforcement 16 is made up of the two working layers 24, 26. The radially inner working reinforcement 24 is arranged radially on the inside of the radially outer working layer 26.

The hoop reinforcement 22 comprises at least one hooping layer and in this case comprises one hooping layer 28. The hoop reinforcement 22 is in this case made up of the hooping layer 28.

The crown reinforcement 16 is surmounted radially by the tread 14. In this case, the hoop reinforcement 22, in this case the hooping layer 28, is arranged radially on the outside of the working reinforcement 20 and is therefore radially interposed between the working reinforcement 20 and the tread 14. Preferably, it may be conceivable for the hoop reinforcement 22 to have an axial width at least as large as the axial width of the working reinforcement 20 and, in this particular instance, in the embodiment illustrated in FIG. 3, the hoop reinforcement 22 has an axial width greater than the axial width of the working reinforcement 20.

The tyre 10 comprises two sidewalls 30 extending the crown 12 radially inwards. The tyre 10 also has two beads 32 radially on the inside of the sidewalls 30. Each sidewall 30 connects each bead 32 to the crown 12.

Each sidewall 30 extends radially between a lower radial side R1 and an upper radial side R2. The lower radial side R1 is, in a meridian section plane, an axial straight line corresponding to the radial border with each border 32 which, it will be recalled here, is defined as being the portion of the tyre that is intended to be in contact with a flange of the rim for its attachment, as is defined in particular by the ETRTO—Standards Manual 2019. The upper radial side R2 is, in a meridian section plane, a straight line perpendicular to the carcass layer or, if the tyre comprises several carcass layers, perpendicular to the radially innermost carcass layer, and passing through a point P on the outer surface of the tyre 10 corresponding to the border between the sidewall 30 and the tread 14. To determine the point P, the tangent N to the outer surface of the tyre is drawn, on a meridian section plane of the tyre, in the mounted position inflated to nominal pressure, at any point of said outer surface in the transition zone between the sidewall 30 and the tread 14. The point P is the radially outermost point for which the angle between said tangent N and a direction substantially parallel to the radial direction Z is equal, in terms of absolute value, to 60°.

Each bead 32 is delimited radially by the upper radial side R1 described above and a lower radial side R0. Each bead 32 has a radially inner end 32A defining the lower radial side R0.

The tyre 10 comprises a carcass reinforcement 34 anchored in each bead 32. The carcass reinforcement 34 extends in each sidewall 30 and radially on the inside of the crown 12. The crown reinforcement 16 is arranged radially between the tread 20 and the carcass reinforcement 34. The carcass reinforcement 34 comprises at least one carcass layer and in this case comprises a single carcass layer 36. In this particular instance, the carcass reinforcement 34 is made up of the single carcass layer 36.

Figure 4:
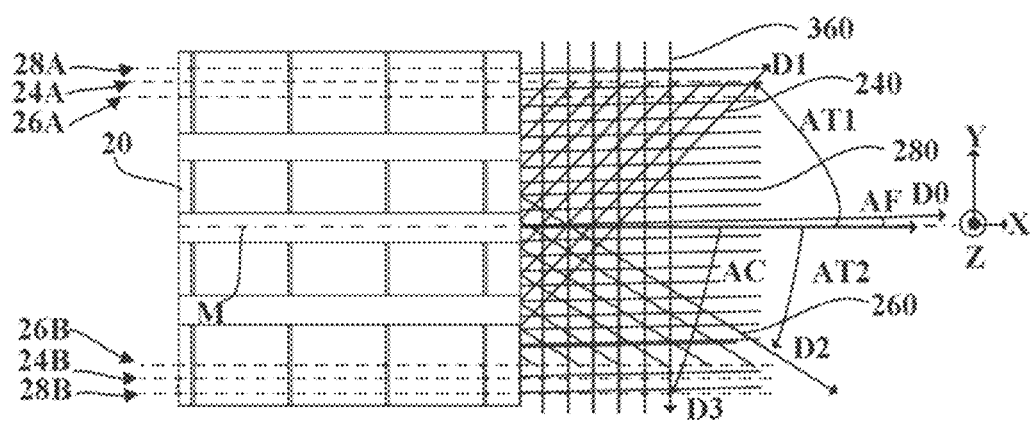
FIG. 4 is a cutaway view of the tyre in FIG. 3, illustrating the arrangement of the filamentary reinforcing elements in and under the crown.

Each working layer 24, 26, hooping layer 28 and carcass layer 36 comprises an elastomer matrix in which one or more filamentary reinforcing elements of the corresponding layer are embedded. These layers will now be described with reference to FIG. 4.

The hoop reinforcement 22, in this case the hooping layer 28, is delimited axially by two axial edges 28A, 28B of the hoop reinforcement 22. The hoop reinforcement 22 comprises one or more hooping filamentary reinforcing elements 280 wound circumferentially in a helix so as to extend axially from the axial edge 28A to the other axial edge 28B of the hooping layer 28 in a main direction DO of each hooping filamentary reinforcing element 280. The main direction DO forms an angle AF, in terms of absolute value, less than or equal to 10°, preferably less than or equal to 7° and more preferably less than or equal to 5° with the circumferential direction X of the tyre 10. In this case, AF=−5°. In the present description, it will be taken as convention that the clockwise direction defines a positive oriented angle.

The radially inner working layer 24 is delimited axially by two axial edges 24A, 24B. The radially inner working layer 24 comprises working filamentary reinforcing elements 240 extending axially from the axial edge 24A to the other axial edges 24B in a manner substantially parallel to one another along a main direction D1. Similarly, the radially outer working layer 26 is delimited axially by two axial edges 26A, 26B. The radially outer working layer 26 comprises working filamentary reinforcing elements 260 extending axially from the axial edge 26A to the other axial edge 26B in a manner substantially parallel to one another along a main direction D2. The main direction D1 along which each working filamentary reinforcing element 240 of the radially inner working layer 24 extends and the main direction D2 along which each working filamentary reinforcing element 260 of the other radially outer working layer 26 form angles AT1 and AT2, respectively, of opposite orientations with the circumferential direction X of the tyre 10. Each main direction D1, D2 forms an angle AT1, AT2, respectively, in terms of absolute value, strictly greater than 10°, preferably ranging from 15° to 50° and more preferably ranging from 25° to 45°, with the circumferential direction X of the tyre 10. In this case, AT1=−33° and AT2=+33°.

The carcass layer 36 is delimited axially by two axial edges 36A, 36B. The carcass layer 36 comprises carcass filamentary reinforcing elements 360 extending axially from the axial edge 36A to the other axial edge 36B of the carcass layer 36 along a main direction D3 forming an angle AC, in terms of absolute value, greater than or equal to 60°, preferably ranging from 80° to 90° and in this case AC=±90°, with the circumferential direction X of the tyre 10.

Each hooping filamentary reinforcing element 280 conventionally comprises two multifilament strands, one of the multifilament strands being made up of a spun yarn of monofilaments of aliphatic polyamide, in this case of nylon with a thread count equal to 140 tex, and the other of these strands being made up of a spun yarn of monofilaments of aromatic polyamide, in this case of aramid with a thread count equal to 167 tex, these two multifilament strands being twisted in a helix individually at 290 turns per metre in one direction and then twisted in a helix together at 290 turns per metre in the opposite direction. These two multifilament strands are wound in a helix around one another.

Each working filamentary reinforcing element 180 is an assembly of an internal layer of two monofilaments of steel wound in a helix with a pitch of 12.5 mm in a first direction, for example the Z direction, and an external layer of four monofilaments of steel wound in a helix around the internal layer at the pitch of 12.5 mm in a second direction opposite to the first direction, for example the S direction, each monofilament of steel having a diameter equal to 0.23 mm.

Each carcass filamentary reinforcing element 340 conventionally comprises three multifilament strands, each multifilament strand made up of a spun yarn of monofilaments of polyesters, in this case of PET, these three multifilament strands being twisted in a helix individually at 220 turns per metre in one direction and then twisted in a helix together at 220 turns per metre in the opposite direction. Each of these multifilament strands has a thread count equal to 220 tex.

The tyre 10 comprises at least one circumferential reinforcing element. In this particular instance, the tyre 10 comprises an axially inner continuous filamentary reinforcing element 38 arranged axially on the inside of the carcass reinforcement 34 and an axially outer continuous filamentary reinforcing element 40 arranged axially on the outside of the carcass reinforcement 34. FIG. 3 shows the axial straight lines D40A and D4OB that pass respectively through the radially inner end 40A and radially outer end 40B, showing that the radial portion of the carcass reinforcement 34 extending between these two straight lines D40A and D4OB is arranged axially on the inside of the axially outer continuous filamentary reinforcing element 40. Similarly, the axial straight lines D38A and D38B that pass respectively through the radially inner end 38A and radially outer end 38B are shown, showing that the radial portion of the carcass reinforcement 34 extending between these two straight lines D38A and D38B is arranged axially on the outside of the axially inner continuous filamentary reinforcing element 38. Each axially inner continuous filamentary reinforcing element 38 and axially outer continuous filamentary reinforcing element 40 respectively comprises a radially inner end 38A, 40A and a radially outer end 38B, 40B. Thus, each continuous filamentary reinforcing element 38, 40 extends radially between the radially inner radial end 38A, 40A and the radially outer radial end 38B, 40B.

Each continuous filamentary reinforcing element 38, 40 and, in particular, the axially outer continuous filamentary reinforcing element 40, extends radially at least in part in each bead 32 and in this case radially entirely in each bead 32. Thus, each radial end 38A, 38B, 40A, 40B is contained between the radially outer radial side R1 and radially inner radial side R0 radially delimiting the bead 32.

Each axial edge 36A, 36B of the carcass layer 36 is arranged axially between the radially inner end 38A of the axially inner continuous filamentary reinforcing element 38 and the radially inner end 40A of the axially outer continuous filamentary reinforcing element 40. In FIG. 3, the axial side of each radially inner end 38A, 40A is depicted using two dashed straight lines 38C and 40C.

Each axially inner continuous filamentary reinforcing element 38 and axially outer continuous filamentary reinforcing element 40 comprises an assembly of several metal elementary monofilaments and, in this particular instance, is made up of an assembly of an internal layer of four 0.35 mm carbon steel elementary elements wound in a helix at a pitch of 5 mm and of an external layer of nine 0.35 mm carbon steel elementary monofilaments wound in a helix around the internal layer at a pitch of 10 mm.

The axially inner continuous filamentary reinforcing element 38 comprises Ni complete circumferential turns, Ni being less than or equal to 10, preferably less than or equal to 8. In this case, the axially inner continuous filamentary reinforcing element 38 comprises Ni=6 complete circumferential turns Ti1, Ti2, Ti3, Ti4, Ti5 and Ti6 and one incomplete circumferential turn Ti'7 about the axis of revolution A, which are radially superposed on one another. The axially inner continuous filamentary reinforcing element also comprises a radially outer free end E3 and a radially inner free end E4 (not shown in FIGS. 3 to 14).

Similarly, and as can be seen in FIGS. 5 to 14, the axially outer continuous filamentary reinforcing element 40 comprises Ne complete circumferential turns, Ne being less than or equal to 10, preferably less than or equal to 8. In this case, the axially outer continuous filamentary reinforcing element 40 comprises Ne=6 complete circumferential turns Te1, Te2, Te3, Te4, Te5 and Te6 and one incomplete circumferential turn Te'7 about the axis of revolution A, which are radially superposed on one another. The axially outer continuous filamentary reinforcing element 40 comprises a radially outer free end E1 and a radially inner free end E2, the radially outer free end E1 being arranged radially on the outside of the radially inner free end E2.

Figure 6:
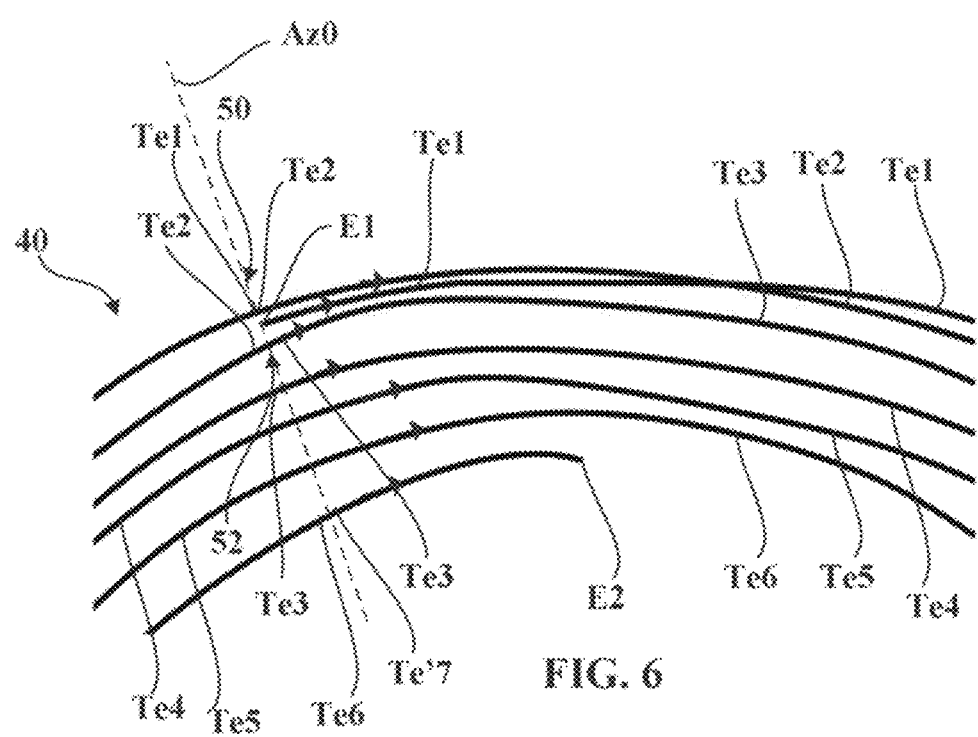
FIG. 6 is a detail view of the portion VI of FIG. 5.

With reference to FIG. 6, with k increasing on progressing along the axially outer continuous filamentary reinforcing element 40 from the radially outer free end E1 to the radially inner free end E2, the complete circumferential turn Te1 starts at the radially outer end E1 and defines a reference azimuth Az0. The complete circumferential turn Te1 ends, after a complete circumferential turn about the axis of revolution A, before the azimuth Az0, from which the complete circumferential turn Te2 then starts. The complete circumferential turn Te2 ends, after a complete turn about the axis of revolution A, before the azimuth Az0, from which the complete circumferential turn Te3 then starts, and so on as far as the complete circumferential turn Te6, which ends, after a complete turn about the axis of revolution A, before the azimuth Az0, from which the incomplete circumferential turn Te'7 then starts.

The axially outer free end E1 of the axially outer continuous filamentary reinforcing element 40 is, at the azimuth of the radially outer free end E1, in this case the reference azimuth Az0, arranged radially between:
- a first portion 50 of the axially outer continuous filamentary reinforcing element 40, this first portion 50 being arranged radially on the outside of the radially outer free end E1, and
- a second portion 52 of the axially outer continuous filamentary reinforcing element 40, this second portion 52 being arranged radially on the inside of the radially outer free end E1.

In this particular instance, the radially outer free end E1 is arranged radially between the first portion 50 distributed over the complete circumferential turns Te1 and Te2 and the second portion 52 distributed over the complete circumferential turns Te2 and Te3.

The first portion 50 and the second portion 52 are radially consecutive. The first portion 50 is, at the azimuth Az0 of the radially outer free end E1, the radially outermost portion of the axially outer continuous filamentary reinforcing element 40.

The tyre 10 according to the first embodiment therefore satisfies only the conditions I and I" described above.

Figure 5:
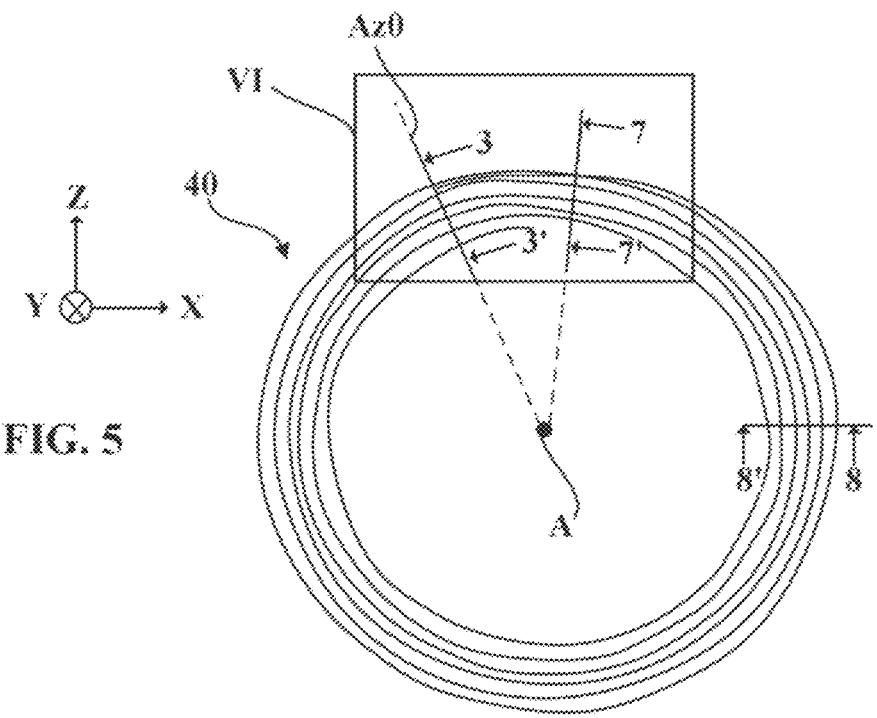
FIG. 5 is a view similar to the one in FIG. 2 of a separated continuous filamentary reinforcing element of the tyre in FIG. 3.

In FIG. 3, corresponding to the view in section on the second plane 3-3' in FIG. 5, the end E1 is depicted in the form of a circle filled with black. In FIG. 3, the end E1 in the plane 3-3' is arranged radially between the first portion 50 distributed over the complete circumferential turns Te1 and Te2 and the second portion 52 distributed over the complete circumferential turns Te2 and Te3.

Figure 7:
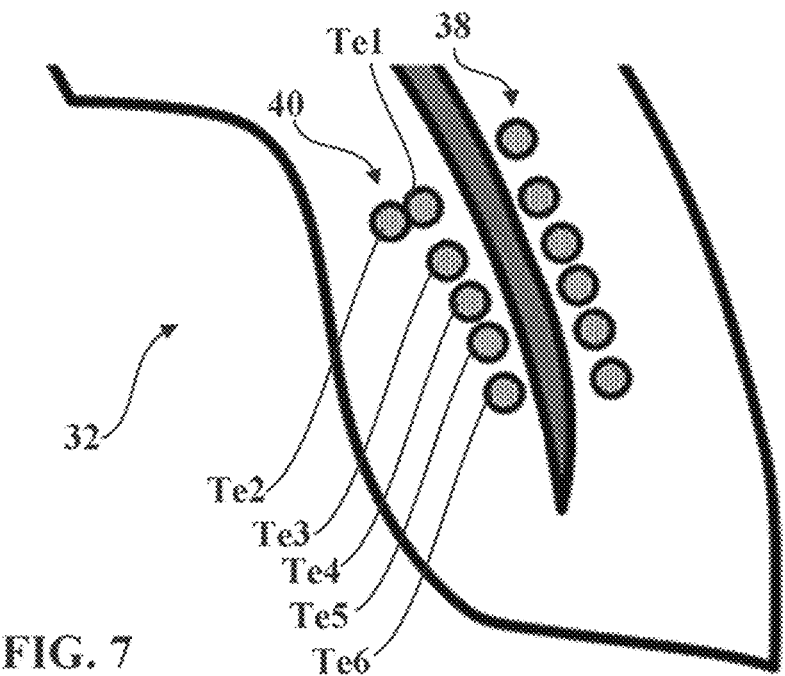
FIGS. 7 and 8 are views of the bead of the tyre in FIG. 3 on the meridian section planes 7-7' and 8-8', respectively, in FIG. 5.

In FIG. 7, corresponding to the view in section on the section plane 7-7' in FIG. 5, that is to say in the meridian section plane in which there is an axial crossing between two portions of the axially outer continuous filamentary reinforcing element 40, the portion of the turn Te1 in this plane 7-7' is axially aligned substantially with the portion of the complete circumferential turn Te2 in this same plane 7-7'.

Figure 8:
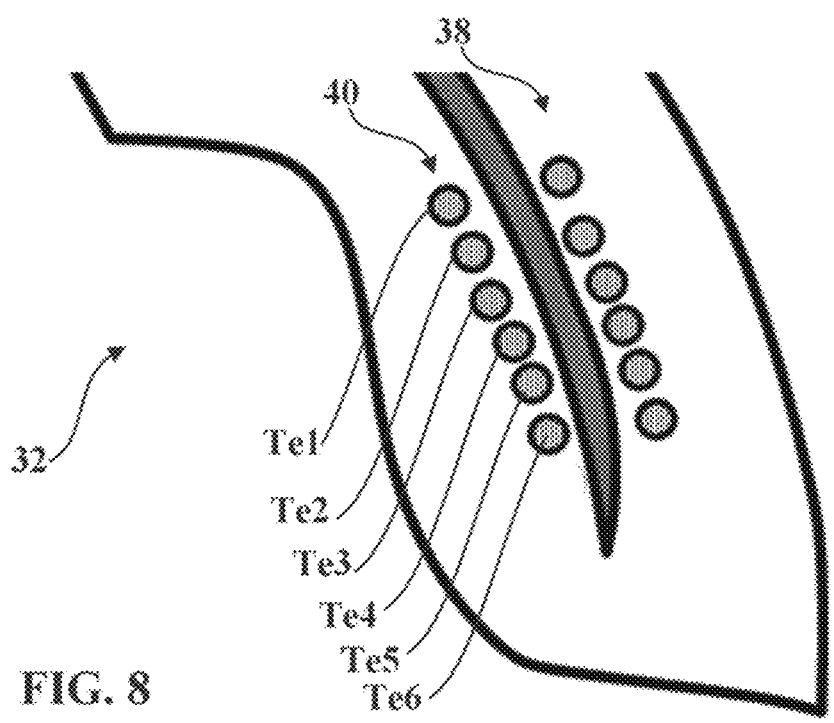

In FIG. 8, corresponding to the view in section on the section plane 8-8' in FIG. 5, the portion of the turn Te1 in this plane 8-8' is arranged radially on the outside of the portion of the complete circumferential turn Te2.

A method for manufacturing the tyre in FIG. 3 will now be described with reference to FIGS. 9 to 14. The method illustrated is of the non-shaping type, meaning that a non-deformable rigid manufacturing support is used. This type of method is described in particular in WO03/101713, EP1094930, EP1463627 or EP0976535.

During a first step, the airtight layer 18 is formed on a manufacturing support substantially exhibiting symmetry of revolution about an axis of revolution B of the support.

Then, a first mass of polymer composition is placed on the airtight layer 18, this first mass being intended to form at least one part of the bead 32. Then, the axially inner continuous filamentary reinforcing element 38 is placed on this first mass of polymer composition. Then, the carcass layer 36 is formed on the axially inner continuous filamentary reinforcing element 38, this carcass layer comprising, axially on the outside of the carcass filamentary reinforcing elements 360, a second mass of polymer composition intended to form at least one part of the bead 32.

Figure 9:
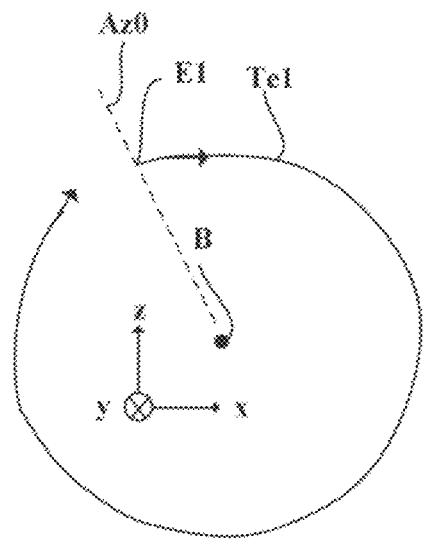
FIGS. 9 to 14 illustrate different steps of the method for manufacturing the tyre in FIG. 3.
Figure 10:
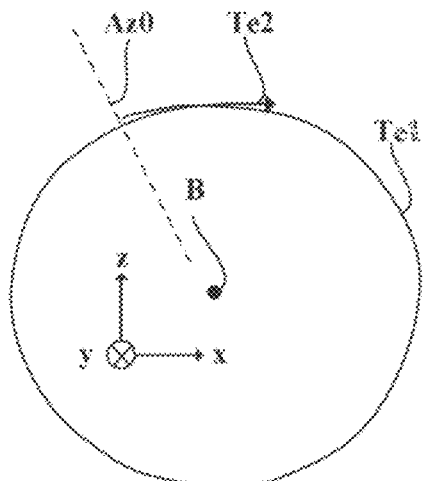
Figure 11:
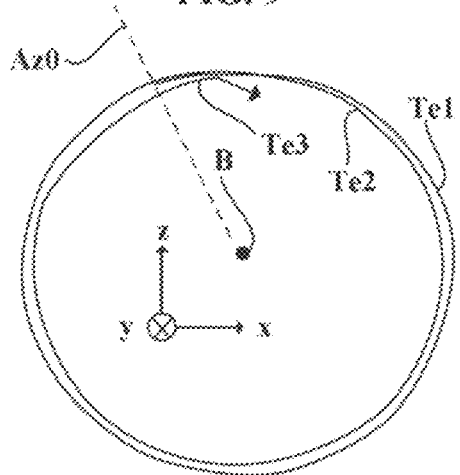
Figure 12:
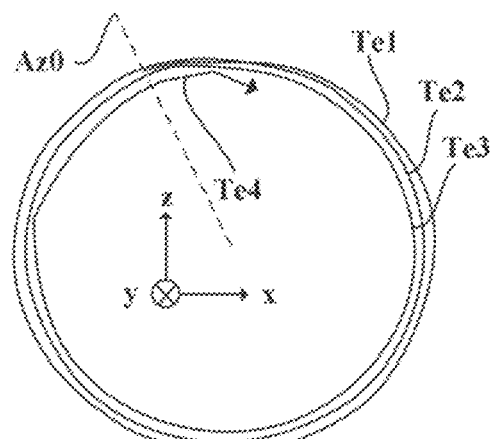
Figure 13:
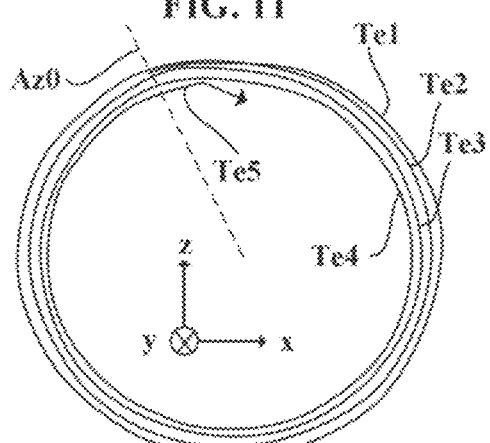
Figure 14:
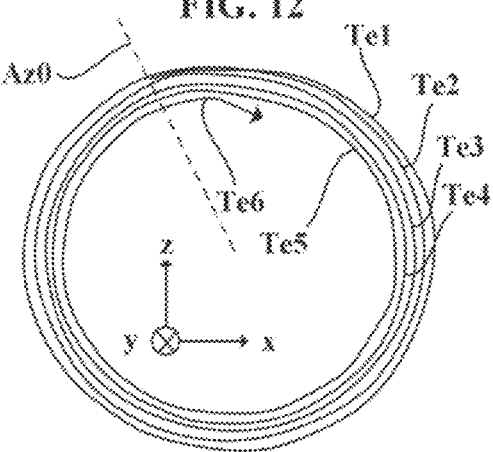

Next, the axially outer continuous filamentary reinforcing element 40 is placed on the second mass of polymer composition. To this end, as is shown in FIG. 9, the radially outer free end E1 is placed directly in contact with the third mass of polymer composition. Then, as is illustrated in FIGS. 10 to 14, the continuous filamentary reinforcing element 40 is wound over the six complete circumferential turns Te1, Te2, Te3, Te4, Te5 and Te6 and over the incomplete circumferential turn T'e7 about the axis of revolution B of the support, which are superposed on one another, such that the radially outer free end E1 is, at the azimuth Az0 of the radially outer free end E1, arranged radially between the first portion 50 and the second portion 52.

The radially outer continuous filamentary reinforcing element 40 illustrated in FIG. 5 is obtained. The method according to the first embodiment therefore satisfies only the condition E1 described above.

The manufacture of the tyre is finished by placing, on the radially outer continuous filamentary reinforcing element 40, a third mass of polymer composition intended to form at least one part of the bead 32, this third mass of polymer composition being intended to be in contact with the mounting support of the tyre 10, for example a rim. The crown 12 is formed by successively laying the working reinforcement 20, the hoop reinforcement 22 and the tread 14.

Figure 15:
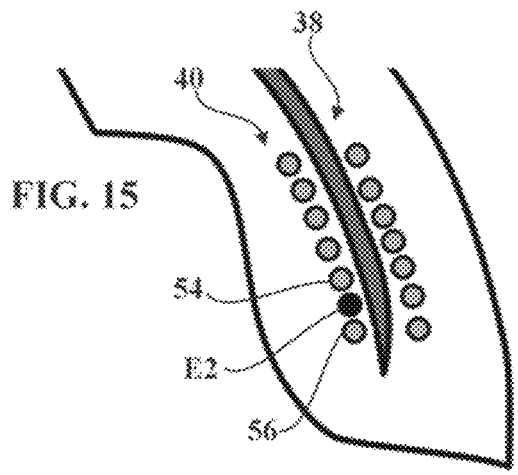
FIG. 15 is a view of a bead of a tyre according to a second embodiment.
Figure 16:
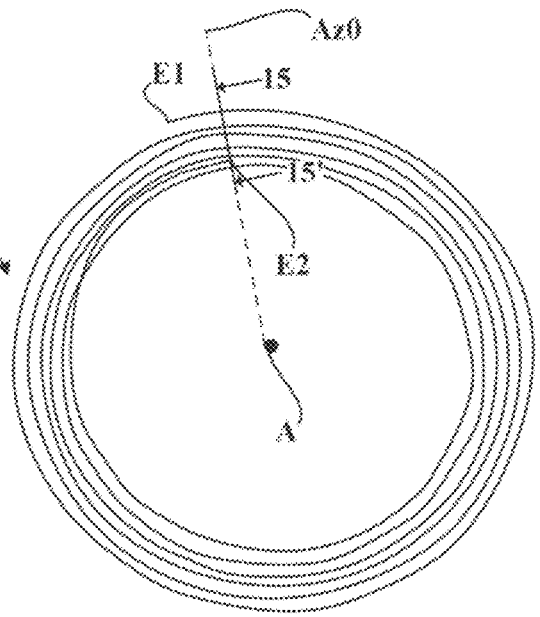
FIGS. 16 and 17 are views similar to the ones in FIGS. 5 and 6 of the tyre in FIG. 15.
Figure 17:
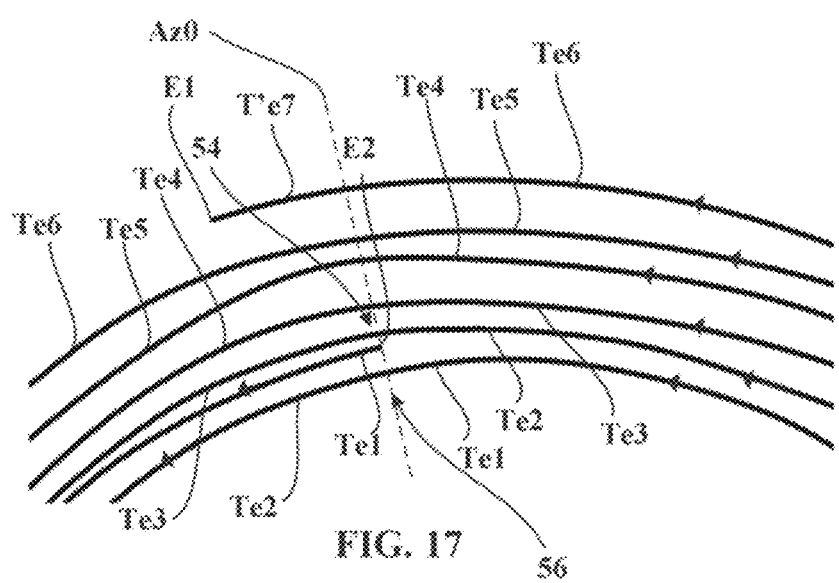

FIGS. 15 to 17 illustrate a second embodiment of the invention. Elements similar to those illustrated in the previous figures are denoted by identical references.

In contrast to the first embodiment, the radially inner free end E2 is in this case threaded. Thus, the radially inner free end E2 is, at the azimuth Az0 of the radially inner free end E2, arranged radially between:
- a first portion 54 of the continuous filamentary reinforcing element 40, this first portion 54 being arranged radially on the outside of the radially inner free end E2, and
- a second portion 56 of the continuous filamentary reinforcing element 40, this second portion 56 being arranged radially on the inside of the radially inner free end E2.

In this particular instance, the radially outer free end E2 is arranged radially between the first portion 54 distributed over the complete circumferential turns Te2 and Te3 and the portion 56 distributed over the complete circumferential turns Te1 and Te2.

The first portion 54 and the second portion 56 are radially consecutive. The second portion 56 is, at the azimuth Az0 of the radially inner free end E2, the radially innermost portion of the continuous filamentary reinforcing element 40.

The tyre 10 according to the second embodiment therefore satisfied the conditions II and II" described above.

In contrast to the method according to the first embodiment, in order to manufacture the tyre according to the second embodiment, the radially inner free end E2 is placed directly in contact with the second mass of polymer composition, then, the continuous filamentary reinforcing element 40 is wound over the six complete circumferential turns Te1, Te2, Te3, Te4, Te5 and Te6 and over the incomplete circumferential turn T'e7 about the axis of revolution B of the support, which are superposed on one another, such that the radially inner free end E2 is, at the azimuth Az0 of the radially inner free end E2, arranged radially between the first portion 54 and the second portion 56.

Figure 18:
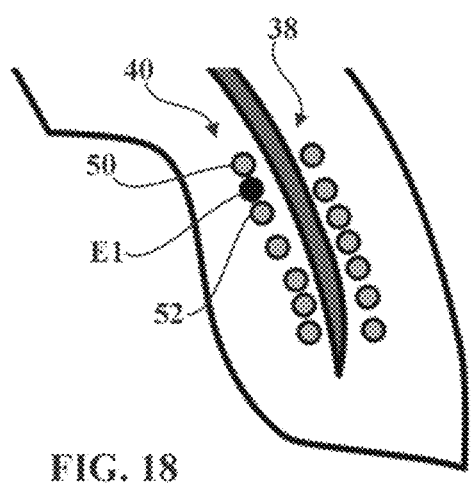
FIGS. 18 and 19 are views of a bead of a tyre according to a third embodiment of the invention.
Figure 19:
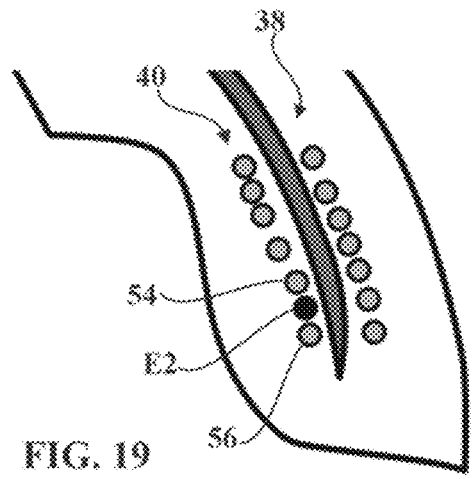
Figure 20:
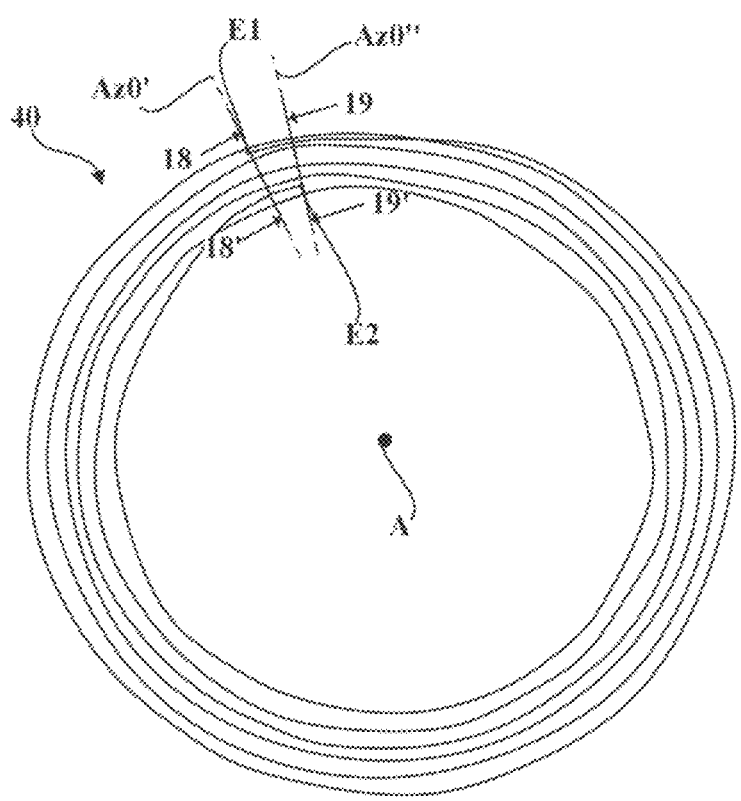
FIG. 20 is a view similar to the ones in FIGS. 5 and 16 of the tyre in FIGS. 18 and 19.

FIGS. 18 to 20 illustrate a third embodiment of the invention. Elements similar to those illustrated in the previous figures are denoted by identical references.

The third embodiment is the combination of the first and second embodiments, in which each radially inner free end E2 and radially outer free end E1 is threaded. In FIG. 20, the reference azimuth Az0' of the radially outer free end E1 is distinguished from the reference azimuth Az0" of the radially inner free end E2. FIG. 18 corresponds to the view in section on the section plane 18-18' in FIG. 20 and FIG. 19 corresponds to the view in section on the section plane 19-19' in FIG. 20.

FIGS. 21 to 25 illustrate further embodiments of the invention. Elements similar to those illustrated in the previous figures are denoted by identical references. In the embodiments in these figures, unlike the previous embodiments and in order to simplify the description, the radially outer free end E1, E3 and radially inner free end E2, E4 are at the same azimuth Az0. Nevertheless, without departing from the scope of the invention, the radially outer free end E1, E3 and radially inner free end E2, E4 could be at different or identical azimuths, with the other features of the embodiments described in FIGS. 21 and 25 being reproduced.

Figure 21:
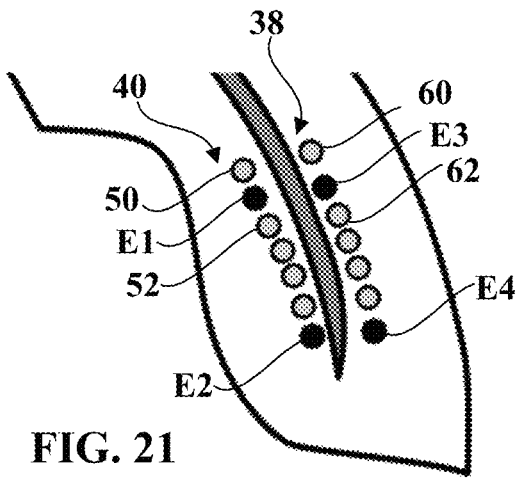
FIGS. 21 to 25 are views similar to the ones in FIGS. 15 and 19 of tyres according to other embodiments of the invention.

FIG. 21 illustrates an embodiment in which only conditions I, I' and I" are satisfied, meaning that each radially outer free end E3, E1, respectively, of each axially inner continuous filamentary reinforcing element 38 and axially outer continuous filamentary reinforcing element 40 is threaded. This embodiment is particularly preferred since it makes it possible to eliminate any risk of cracking at the radially outer free ends of each axially inner continuous filamentary reinforcing element 38 and axially outer continuous filamentary reinforcing element 40.

In this particular instance, in addition to the features of the axially outer continuous filamentary reinforcing element 40 that are described in the first embodiment, the tyre is such that the radially outer free end E3 of the axially inner continuous filamentary reinforcing element 38 is, at the azimuth Az0 of the radially outer free end E3, arranged radially between:
a first portion 60 of the axially inner continuous filamentary reinforcing element 38, this first portion 60 being arranged radially on the outside of the radially outer free end E3, and
a second portion 62 of the axially inner continuous filamentary reinforcing element 38, this second portion 62 being arranged radially on the inside of the radially outer free end E3.

Figure 22:
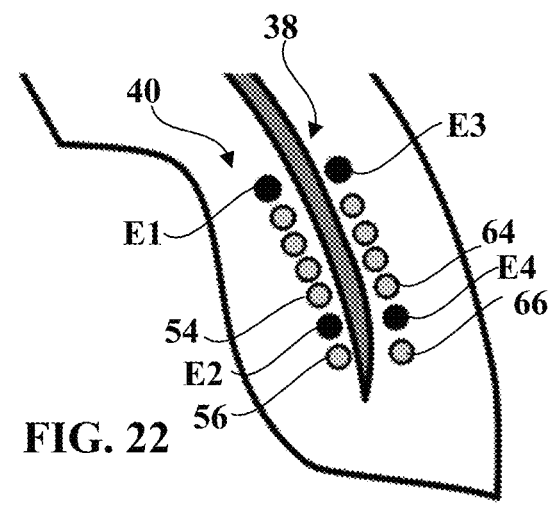

FIG. 22 illustrates an embodiment in which only conditions II, II' and II" are satisfied, meaning that each radially inner free end E4, E2, respectively, of each axially inner continuous filamentary reinforcing element 38 and axially outer continuous filamentary reinforcing element 40 is threaded.

In this particular instance, in addition to the features of the axially outer continuous filamentary reinforcing element 40 that are described in the second embodiment, the tyre is such that the radially inner free end E4 of the axially inner continuous filamentary reinforcing element 38 is, at the azimuth Az0 of the radially inner free end E4, arranged radially between:
a first portion 64 of the axially inner continuous filamentary reinforcing element 38, this first portion 64 being arranged radially on the outside of the radially inner free end E4, and
a second portion 66 of the axially inner continuous filamentary reinforcing element 38, this second portion 66 being arranged radially on the inside of the radially inner free end E4.

Figure 23:
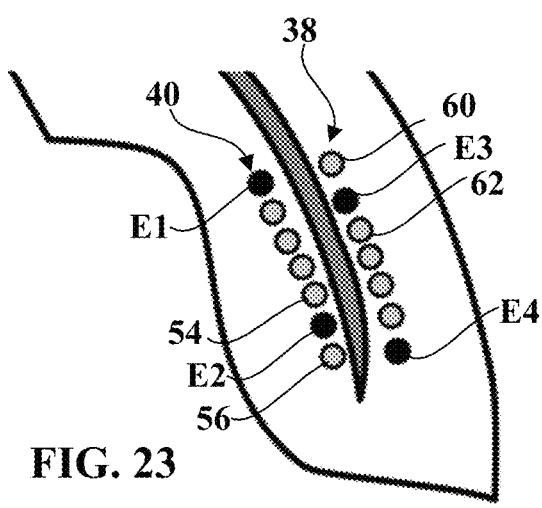

FIG. 23 illustrates an embodiment in which:
conditions I, II are both satisfied for the tyre,
only condition I' is satisfied for the axially inner continuous filamentary reinforcing element 38, meaning that the radially outer free end E3 of the axially inner continuous filamentary reinforcing element 38 is threaded,
only condition II" is satisfied for the axially outer continuous filamentary reinforcing element 40, meaning that the radially inner free end E2 of the axially outer continuous filamentary reinforcing element 40 is threaded.

Figure 24:
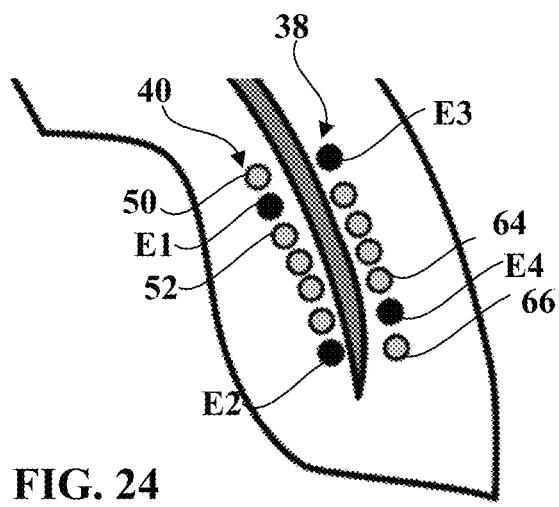

FIG. 24 illustrates an embodiment in which:
conditions I, II are both satisfied for the tyre,
only condition II" is satisfied for the axially inner continuous filamentary reinforcing element 38, meaning that the radially inner free end E4 of the axially inner continuous filamentary reinforcing element 38 is threaded,
only condition I" is satisfied for the axially outer continuous filamentary reinforcing element 40, meaning that the radially outer free end E1 of the axially outer continuous filamentary reinforcing element 40 is threaded.

Figure 25:
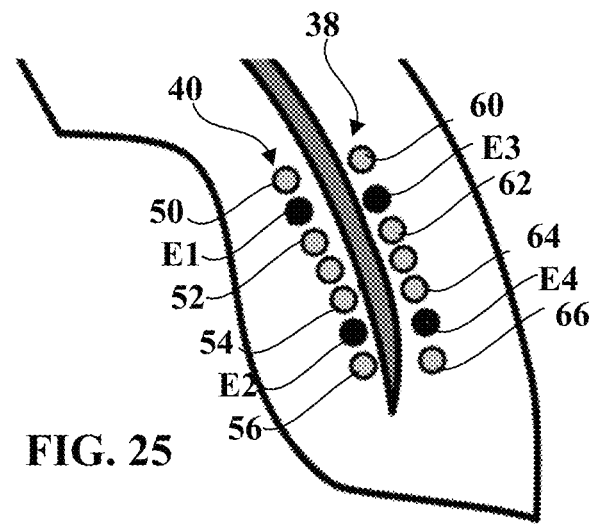

FIG. 25 illustrates an embodiment resulting from the combination of the embodiments illustrated in FIGS. 21 and 22 or from the combination of the embodiments illustrated in FIGS. 23 and 24, meaning that:
conditions I, II are both satisfied for the tyre,
conditions I', II' are both satisfied for the axially inner continuous filamentary reinforcing element 38, meaning that each radially outer free end E3 and radially inner free end E4 of the axially inner continuous filamentary reinforcing element 38 is threaded,
conditions I", II" are both satisfied for the axially outer continuous filamentary reinforcing element 40, meaning that each radially outer free end E1 and radially inner free end E2 of the axially outer continuous filamentary reinforcing element 40 is threaded.

Figure 26:
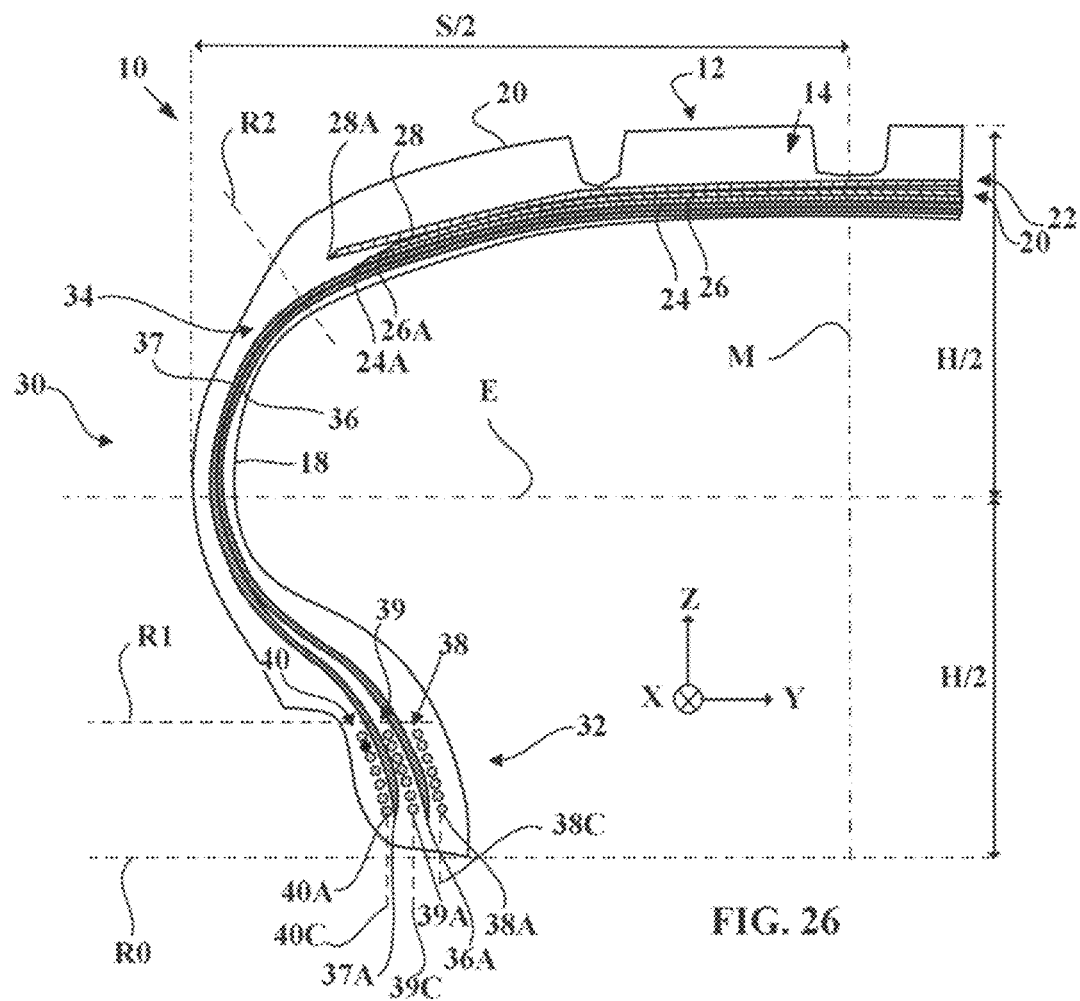
FIG. 26 is a view similar to the one in FIG. 3 of a tyre according to a fourth embodiment.
Figure 27:
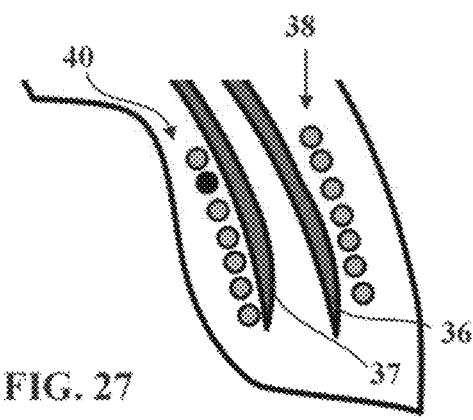
FIG. 27 is a view similar to the one in FIGS. 15 and 19 of a tyre according to a fifth embodiment.

FIG. 26 illustrates a fourth embodiment of the invention. Elements similar to those illustrated in the previous figures are denoted by identical references.

Unlike the first embodiment, the carcass reinforcement 34 comprises two carcass layers. In this case, the carcass reinforcement 34 comprises a radially inner carcass layer 36 and a radially outer carcass layer 37 arranged on the outside of the radially inner carcass layer 36. The radially outer carcass layer 37 is delimited axially by two axial edges 37A, 37B. Similarly to the radially inner carcass layer 36, the radially outer carcass layer 37 comprises carcass filamentary reinforcing elements extending axially from the axial edge 37A to the other axial edge 37B of the radially outer carcass layer 37 along a main direction forming an angle, in terms of absolute value, greater than or equal to 60°, preferably ranging from 80° to 90° and in this case equal to +90°, with the circumferential direction X of the tyre 10.

In addition to the axially inner reinforcing element 38 and axially outer reinforcing element 40, each bead 32 comprises an axially intermediate continuous filamentary reinforcing element 39 arranged axially between the axially inner continuous filamentary reinforcing element 38 and the axially outer continuous filamentary reinforcing element 40. The axially intermediate continuous filamentary reinforcing element 39 comprises a radially inner end 39A. Similarly to FIG. 3, in FIG. 25, the axial side of each radially inner end 38A, 39A and 40A is depicted using two dashed straight lines 38C, 39C and 40C.

The axial edge 36A of the radially inner carcass layer 36 is arranged axially between the radially inner end 38A of the axially inner continuous filamentary reinforcing element 38 and the radially inner end 39A of the axially intermediate continuous filamentary reinforcing element 39.

The axial edge 37A of the radially outer carcass layer 37 is arranged axially between the radially inner end 39A of the axially intermediate continuous filamentary reinforcing element 39 and the radially inner end 40A of the axially outer continuous filamentary reinforcing element 40.

FIG. 26 illustrates a fifth embodiment of the invention. Elements similar to those illustrated in the previous figures are denoted by identical references.

As in the fourth embodiment, the tyre 10 comprises two carcass layers 36, 37. However, the tyre 10 according to the fifth embodiment does not comprise an axially intermediate continuous filamentary reinforcing element 39 arranged axially between the axially inner continuous filamentary reinforcing element 38 and the axially outer continuous filamentary reinforcing element 40.

The invention is not limited to the above-described embodiments.

Thus, for example, although not depicted in the above figures, it will optionally be preferred for the azimuth of the radially outer free end and the azimuth of the radially inner free end to be separated from one another by an angular spacing of between 90° and 180°, for example 120°.

The invention claimed is:

1. A tire of substantially toric shape about an axis of revolution (A),
the tire comprising a crown, two sidewalls and two beads, each sidewall connecting each bead to the crown,
the tire comprising at least one continuous filamentary reinforcing element comprising N≥2 circumferential turns about the axis of revolution (A) which are radially superposed on one another,
the at least one continuous filamentary reinforcing element comprising a radially outer free end (E1, E3) and a radially inner free end (E2, E4), and
the at least one continuous filamentary reinforcing element extending radially at least in part in one of the two beads,
wherein at least one of condition I and II is satisfied:
I—the radially outer free end (E1, E3) is, at an azimuth (Az0; Az0') of the radially outer free end (E1, E3), arranged radially between:
at least one first radially outer portion of the at least one continuous filamentary reinforcing element, the at least one first radially outer portion being arranged radially on the outside of the radially outer free end (E1, E3), and
at least one second radially outer portion of the at least one continuous filamentary reinforcing element, the at least one second radially outer portion being arranged radially on the inside of the radially outer free end (E1, E3), and
II—the radially inner free end (E2, E4) is, at an azimuth (Az0; Az0") of the radially inner free end (E2, E4), arranged radially between:
at least one first radially inner portion of the at least one continuous filamentary reinforcing element, the at least one first radially inner portion being arranged radially on the outside of the radially inner free end (E2, E4), and
at least one second radially inner portion of the at least one continuous filamentary reinforcing element, the at least one second radially inner portion being arranged radially on the inside of the radially inner free end (E2, E4).

2. The tire according to claim 1, wherein only condition I is satisfied.

3. The tire according to claim 1, wherein the at least one first radially outer portion of the at least one continuous filamentary reinforcing element arranged radially on the outside of the radially outer free end (E1, E3) and the at least one second radially outer portion of the at least one continuous filamentary reinforcing element arranged radially on the inside of the radially outer free end (E1, E3) are radially consecutive, and/or
wherein the at least one first radially inner portion of the at least one continuous filamentary reinforcing element arranged radially on the outside of the radially inner free end (E2, E4) and the at least one second radially inner portion of the at least one continuous filamentary reinforcing element arranged radially on the inside of the radially inner free end (E2, E4) are radially consecutive.

4. The tire according to claim 1, wherein the at least one first radially outer portion of the continuous filamentary reinforcing element arranged radially on the outside of the radially outer free end (E1, E3) is, at the azimuth (Az0; Az0') of the radially outer free end (E1, E3), the radially outermost portion of the at least one continuous filamentary reinforcing element, and/or
wherein the at least one second radially inner portion of the at least one continuous filamentary reinforcing element arranged radially on the inside of the radially inner free end (E2, E4) is, at the azimuth (Az0; Az0") of the radially inner free end (E2, E4), the radially innermost portion of the at least one continuous filamentary reinforcing element.

5. The tire according to claim 1, wherein the at least one continuous filamentary reinforcing element extends radially entirely in the bead.

6. The tire according to claim 1, further comprising a carcass reinforcement that is anchored in each bead and extends in each sidewall and radially on the inside of the crown.

7. The tire according to claim 6, wherein the at least one continuous filamentary reinforcing element is arranged axially on the outside of the carcass reinforcement.

8. The tire according to claim 6, wherein each bead comprises:
an axially inner continuous filamentary reinforcing element arranged axially on the inside of the carcass reinforcement; and
an axially outer continuous filamentary reinforcing element arranged axially on the outside of the carcass reinforcement.

9. The tire according to claim 8, wherein, with the carcass reinforcement comprising at least one carcass layer, the or each carcass layer being delimited axially by two axial edges, each axial edge is arranged axially between a radially inner end of the axially inner continuous filamentary reinforcing element and a radially inner end of the axially outer continuous filamentary reinforcing element.

10. The tire according to claim 8, wherein the axially outer continuous filamentary reinforcing element comprises $Ne \geq 2$ circumferential turns about the axis of revolution (A) which are radially superposed on one another, with the axially outer filamentary reinforcing element comprising a radially outer free end (E1) and a radially inner free end (E2), and wherein at least one of the following conditions I", II" is satisfied:
I"—the radially outer free end (E1) of the axially outer continuous filamentary reinforcing element is, at the azimuth (Az0; Az0') of the radially outer free end (E1), arranged radially between:
at least one first radially outer portion of the axially outer continuous filamentary reinforcing element, the at least one first radially outer portion being arranged radially on the outside of the radially outer free end (E1), and
at least one second radially outer portion of the axially outer continuous filamentary reinforcing element, the at least one second radially outer portion being arranged radially on the inside of the radially outer free end (E1), and
II"—the radially inner free end (E2) of the axially outer continuous filamentary reinforcing element is, at the azimuth (Az0; Az0") of the radially inner free end (E2), arranged radially between:
at least one first radially inner portion of the axially outer continuous filamentary reinforcing element, the at least one first radially inner portion being arranged radially on the outside of the radially inner free end (E2), and
at least one second radially inner portion of the axially outer continuous filamentary reinforcing element, the at least one second radially inner portion being arranged radially on the inside of the radially inner free end (E2).

11. The tire according to claim 6, wherein the carcass reinforcement comprises at least one carcass layer, the or each carcass layer comprising carcass filamentary reinforcing elements, each carcass filamentary reinforcing element extending substantially along a main direction (D3) that forms an angle (AC), in terms of absolute value, greater than or equal to 60°, with the circumferential direction (X) of the tire.

12. The tire according to claim 6, wherein the crown comprises:
a tread intended to come into contact with a ground when the tire is running; and
a crown reinforcement arranged radially between the tread and the carcass reinforcement.

13. The tire according to claim 12, wherein the crown reinforcement comprises a working reinforcement comprising at least one working layer, the or each working layer comprising working filamentary reinforcing elements, each working filamentary reinforcing element extending along a main direction (D1, D2) that forms an angle (AT1, AT2), in terms of absolute value, strictly greater than 10°, with the circumferential direction (X) of the tire.

14. The tire according to claim 12, wherein the crown reinforcement comprises a hoop reinforcement comprising at least one hooping layer, the or each hooping layer comprising at least one hooping filamentary reinforcing element wound circumferentially in a helix along a main direction (DO) of the or of each hooping filamentary reinforcing element that forms an angle (AF), in terms of absolute value, less than or equal to 10°, with the circumferential direction (X) of the tire.

15. A method for manufacturing the tire according to claim 1, the method comprising:
placing a mass of polymer composition on a support substantially exhibiting symmetry of revolution about an axis of revolution (B) of the support, the mass of polymer composition being intended to form at least a part of at least one of the beads;
then carrying out one or the other of the following steps EI and EII:
EI—placing the radially outer free end (E1, E3) directly in contact with the mass of polymer composition and then winding the at least one continuous filamentary reinforcing element through $N>2$ circumferential turns about the axis of revolution (B) of the support, which are superposed on one another, such that the radially outer free end (E1, E3) is, at the azimuth (Az0; Az0') of the radially outer free end (E1, E3), arranged radially between:
at least the first radially outer portion of the at least one continuous filamentary reinforcing element, which is arranged radially on the outside of the radially outer free end (E1, E3), and
at least the second radially outer portion of the at least one continuous filamentary reinforcing element, which is arranged radially on the inside of the radially outer free end (E1, E3), and
EII—placing the radially inner free end (E2, E4) directly in contact with the mass of polymer composition and then winding the at least one continuous filamentary reinforcing element through $N>2$ circumferential turns about the axis of revolution (B) of the support, which are superposed on one another, such that the radially inner free end (E2, E4) is, at the azimuth (Az0; Az0") of the radially inner free end (E2, E4), arranged radially between:
at least the first radially inner portion of the at least one continuous filamentary reinforcing element, which is arranged radially on the outside of the radially inner free end (E2, E4), and
at least the second radially inner portion of the at least one continuous filamentary reinforcing element, which is arranged radially on the inside of the radially inner free end (E2, E4).

* * * * *